United States Patent
Tago et al.

(10) Patent No.: US 11,211,626 B2
(45) Date of Patent: Dec. 28, 2021

(54) POLYMER ELECTROLYTE MEMBRANE, MEMBRANE ELECTRODE ASSEMBLY, AND SOLID POLYMER ELECTROLYTE FUEL CELL

(71) Applicant: ASAHI KASEI KABUSHIKI KAISHA, Tokyo (JP)

(72) Inventors: Takahiro Tago, Tokyo (JP); Kuon Miyazaki, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 16/611,584

(22) PCT Filed: May 11, 2017

(86) PCT No.: PCT/JP2017/017915
§ 371 (c)(1),
(2) Date: Nov. 7, 2019

(87) PCT Pub. No.: WO2018/207325
PCT Pub. Date: Nov. 15, 2018

(65) Prior Publication Data
US 2020/0358119 A1    Nov. 12, 2020

(51) Int. Cl.
*H01M 8/1032* (2016.01)
*C08G 61/12* (2006.01)
*C08J 5/22* (2006.01)
*C08L 25/02* (2006.01)
*C08L 65/00* (2006.01)
*H01M 8/1027* (2016.01)
*H01M 8/1039* (2016.01)
*H01M 8/1018* (2016.01)

(52) U.S. Cl.
CPC .......... *H01M 8/1032* (2013.01); *C08G 61/12* (2013.01); *C08J 5/2225* (2013.01); *C08L 25/02* (2013.01); *C08L 65/00* (2013.01); *H01M 8/1027* (2013.01); *H01M 8/1039* (2013.01); *C08J 2365/00* (2013.01); *C08L 2207/02* (2013.01); *H01M 2008/1095* (2013.01); *H01M 2300/0082* (2013.01)

(58) Field of Classification Search
CPC ............. H01M 8/1032; H01M 8/1027; H01M 8/1039; H01M 2300/0082; H01M 2008/1095; C08G 61/12; C08J 5/2225; C08J 2365/00; C08L 25/02; C08L 65/00
See application file for complete search history.

(56) References Cited

U.S. PATENT DOCUMENTS

| | | |
|---|---|---|
| 2003/0060521 A1 | 3/2003 | Fisher |
| 2006/0068268 A1 | 3/2006 | Olmeijer |
| 2009/0191442 A1 | 7/2009 | Hoshikawa et al. |
| 2010/0196782 A1 | 8/2010 | Izuhara et al. |
| 2016/0301092 A1 | 10/2016 | Kim et al. |

FOREIGN PATENT DOCUMENTS

| | | |
|---|---|---|
| JP | 2005509243 A | 4/2005 |
| JP | 2006164777 A | 6/2006 |
| JP | 2008512844 A | 4/2008 |
| JP | 2009187936 A | 8/2009 |
| JP | 2010177032 A | 8/2010 |
| JP | 4836438 B2 | 12/2011 |
| JP | 2014232663 A | 12/2014 |
| JP | 2016040781 A | 3/2016 |
| KR | 1020090040431 A | 4/2009 |
| KR | 1020160120078 A | 10/2016 |

OTHER PUBLICATIONS

Nov. 12, 2019, International Preliminary Report on Patentability issued in the International Patent Application No. PCT/JP2017/017915.
D.C. Lee et al., Nafion/graphene oxide composite membranes for low humidifying polymer electrolyte membrane fuel cell, Journal of Membrane Science, 2014, pp. 20-28, vol. 452.
Jul. 18, 2017, International Search Report issued in the International Patent Application No. PCT/JP2017/017915.
Jie-Cheng Tsai et al., Blended Nafion® /SPEEK direct methanol fuel cell membranes for reduced methanol permeability, Journal of Power Sources, 2009, pp. 958-965, vol. 189, Issue 2.

*Primary Examiner* — Sarah A. Slifka
(74) *Attorney, Agent, or Firm* — Kenja IP Law PC

(57) ABSTRACT

A polymer electrolyte membrane of the present disclosure comprises a perfluorosulfonic acid resin (A), wherein the polymer electrolyte membrane has a phase-separation structure having a phase where fluorine atoms are detected in majority and a phase where carbon atoms are detected in majority, in an image of a membrane surface observed under an SEM-EDX, and the polymer electrolyte membrane has a phase having an average aspect ratio of 1.5 or more and 10 or less in an image of a membrane cross-section observed under an SEM.

19 Claims, No Drawings

POLYMER ELECTROLYTE MEMBRANE, MEMBRANE ELECTRODE ASSEMBLY, AND SOLID POLYMER ELECTROLYTE FUEL CELL

TECHNICAL FIELD

The present disclosure relates to a polymer electrolyte membrane, a membrane electrode assembly, and a solid polymer electrolyte fuel cell.

BACKGROUND

Fuel cells generate electric energy by means of electrochemical reactions of fuel (hydrogen source) and an oxidizing agent (oxygen) in the cells. In other words, fuel cells directly convert chemical energy of the fuel into electric energy. As fuel sources, pure hydrogen and substances containing hydrogen element, such as petroleum, natural gases (e.g., methane), and methanol, can be used.

Fuel cells are characteristic in that they have no mechanical parts and thus generate lower noises, and in principle they can generate power semi-permanently as long as external supply of fuel and an oxidizing agent is continued.

Electrolytes are classified into several types including liquid and solid electrolytes. Solid polymer electrolyte fuel cells employ polymer electrolyte membranes as electrolytes.

Particularly, solid polymer electrolyte fuel cells are expected to be alternative power sources for automobiles, home co-generation systems, portable generators, and the like because they can operate at lower temperatures as compared to fuel cells in other types.

A solid polymer electrolyte fuel cell comprises at least a membrane electrode assembly comprising a proton exchange membrane and gas diffusion electrodes bonded to the respective surfaces of the proton exchange membrane, each gas diffusion electrode comprising an electrode catalyst layer and a gas diffusion layer laminated to each other. Here, the proton exchange membrane is a material that has strong acidic groups, such as sulfonic acid groups and carboxylic acid groups, in the polymer chain and exhibits properties to selectively allow proton permeation. As such proton exchange membranes, perfluoro proton exchange membranes such as Nafion® (Nafion is a registered trademark in Japan, other countries, or both, and is manufactured by E. I. du Pont de Nemours and Company) which has a high chemical stability, are exemplified and are preferably used.

For operating a fuel cell, a fuel (e.g., hydrogen) is fed to an anode-side gas diffusion electrode and an oxidizing agent (e.g., oxygen or air) is fed to a cathode-side gas diffusion electrode, and the electrodes are coupled to an external circuit to initiate an operation. Specifically, in the case where hydrogen is used as a fuel, hydrogen is oxidized on an anode catalyst, thereby inducing proton generation. After the protons permeate through a proton-conductive polymer in the anode catalyst layer, the protons then migrate in the proton exchange membrane and permeate through a proton-conductive polymer in a cathode catalyst layer to reach a cathode catalyst. Meanwhile, electrons which are produced concurrently with the protons by oxidation of hydrogen pass through the external circuit to reach the cathode-side gas diffusion electrode. On the cathode catalyst, oxygen of the oxidizing agent reacts to the protons to generate water. At this time, electric energy can be extracted. At this time, the proton exchange membrane also needs to serve as a gas barrier. A proton exchange membrane having high gas permeability causes cross leakage; that is, leakage of anode-side hydrogen to the cathode side and leakage of cathode-side oxygen to the anode side. Occurrence of the cross leakage causes the so-called chemical short, resulting in hindrance of extraction of good voltage and reduction in the fuel efficiency.

Moreover, the occurrence of the cross leakage of gases in a proton exchange membrane causes generation of hydrogen peroxide on the anode catalyst or the cathode catalyst, resulting in chemical degradation of the membrane by the hydroxy radicals generated from hydrogen peroxide. Pinholes are eventually caused in the membrane, which makes a sufficient chemical durability difficult to be achieved.

In the meantime, a reduction in the thicknesses of electrolyte membranes has been recently studied in view of reducing the internal resistances and further enhancing the output of fuel cells. In addition, in view of cost reduction through reduction in auxiliary devices, such as radiators and humidifiers, there have been needs for fuel cells that can be operated under high temperature and low humidifying conditions (at 100 to 120° C. and in a relative humidity (RH) of 0 to 30%). However, reduction in the thicknesses of electrolyte membranes and operations under high-temperature conditions lower the gas barrier capability, which worsens the problems of reduced voltages, reduced fuel efficiencies, and reduced chemical durability caused by cross leakage of the gases. A reduction in mechanical strength of the membranes themselves, which may present such problems that the membranes become difficult to be handled when membrane electrode assemblies are produced or cells are constructed, or the membranes are broken due to dimensional change induced by uptake of water produced on the cathode side.

PTL 1 discloses that a polymer electrolyte membrane constituted from a perfluorosulfonic acid resin and a basic resin formed a finely dispersed sea-island structure, and reduced cross leakage of gases for long time even in chemical durability tests under high temperature and low humidifying conditions (at 100° C. and in a RH of 20%).

PTL 2 discloses that a polymer electrolyte membrane made from a perfluorosulfonic acid resin and an aromatic hydrocarbon sulfonic acid resin exhibited an excellent gas barrier capability.

CITATION LIST

Patent Literature

PTL 1: JP4836438B
PTL 2: JP2014-232663A

SUMMARY

Technical Problem

The polymer electrolyte membrane disclosed in PTL 1, however, contained resins in different types in the perfluorosulfonic acid resin. Thus the elongation at break and the physical durability were insufficient in the case of thinner membranes or under high temperature and low humidifying conditions.

The polymer electrolyte membrane discloses in PTL 2 had an excellent initial gas barrier capability. However, because it contained the aromatic hydrocarbon sulfonic acid resin filler that was simply blended, the elongation at break was low and the gas barrier capability and the chemical durability over time were insufficient.

Accordingly, the present disclosure is directed to providing a polymer electrolyte membrane that can achieve a favorable balance between a high elongation at break and a high gas barrier capability (e.g., the hydrogen gas barrier capability), and exhibits a high physical durability, as well as exhibiting a high chemical durability even under high temperature and low humidifying conditions, even when the polymer electrolyte membrane contains different resins that are mixed together.

Solution to Problem

Specifically, the present disclosure provides the following:

[1] A polymer electrolyte membrane comprising:
a perfluorosulfonic acid resin (A),
wherein the polymer electrolyte membrane has a phase-separation structure having a phase where fluorine atoms are detected in majority and a phase where carbon atoms are detected in majority, in an image of a membrane surface observed under an SEM-EDX, and
the polymer electrolyte membrane has a phase having an average aspect ratio of 1.5 or more and 10 or less in an image of a membrane cross-section observed under an SEM.

[2] The polymer electrolyte membrane of [1], wherein a proportion of a relative standard deviation of a carbon-fluorine peak intensity ratio at a magnification of ×1,500 and a relative standard deviation of a carbon-fluorine peak intensity ratio at a magnification of ×150 (the relative standard deviation at ×1,500/the relative standard deviation at ×150) in the image of the membrane surface observed under the SEM-EDX is 0.20 or more and 5.0 or less.

[3] The polymer electrolyte membrane of [2], wherein an average carbon-fluorine peak intensity ratio at a magnification of ×1,500 in the image of the membrane surface observed under the SEM-EDX is 0.50 or more and 20 or less, and
a hydrogen permeability coefficient at 80° C. and in a relative humidity (RH) of 30% is $5.0 \times 10^{-9}$ cc·cm/cm$^2$·s·cmHg or less.

[4] The polymer electrolyte membrane of any one of [1] to [3], wherein the phase-separation structure is a sea-island structure.

[5] The polymer electrolyte membrane of any one of [1] to [4], further comprising an acidic group-containing aromatic hydrocarbon resin (B).

[6] The polymer electrolyte membrane of [5], wherein a mass ratio of the perfluorosulfonic acid resin (A) and the acidic group-containing aromatic hydrocarbon resin (B) (a mass of the resin (A)/a mass of the resin (B)) is 90/10 to 50/50.

[7] The polymer electrolyte membrane of [5] or [6], further comprising a compatibilizer (C) for the perfluorosulfonic acid resin (A) and the acidic group-containing aromatic hydrocarbon resin (B).

[8] The polymer electrolyte membrane of any one of [1] to [7], further comprising an acidic group-containing aromatic hydrocarbon resin (B),
wherein the polymer electrolyte membrane is produced through a step of mixing a solution containing the perfluorosulfonic acid resin (A) and a solution containing the acidic group-containing aromatic hydrocarbon resin (B).

[9] The polymer electrolyte membrane of [8], wherein peak tops of scattering diameters of the solution containing the perfluorosulfonic acid resin (A) and the solution containing the acidic group-containing aromatic hydrocarbon resin (B) in a dynamic light scattering measurement are within a range of 10 μm or more and 200 μm or less.

[10] The polymer electrolyte membrane of [7], wherein the polymer electrolyte membrane is produced through a step of mixing the solution containing the perfluorosulfonic acid resin (A), the solution containing the acidic group-containing aromatic hydrocarbon resin (B), and a solution containing the compatibilizer (C).

[11] The polymer electrolyte membrane of [10], wherein a mixed solution of the solution containing the perfluorosulfonic acid resin (A), the solution containing the acidic group-containing aromatic hydrocarbon resin (B), and the solution containing the compatibilizer (C) has a transmittance of 90% T or more at a wavelength of 800 nm in an UV measurement.

[12] The polymer electrolyte membrane of [10] or [11], wherein a solid content concentration of the compatibilizer (C) in the mixed solution of the solution containing the perfluorosulfonic acid resin (A), the solution containing the acidic group-containing aromatic hydrocarbon resin (B), and the solution containing the compatibilizer (C) is 0.001% by mass or more and less than 1% by mass.

[13] The polymer electrolyte membrane of any one of [1] to [12], comprising:
a layer containing the perfluorosulfonic acid resin (A) and the acidic group-containing aromatic hydrocarbon resin (B); and
a layer containing the perfluorosulfonic acid resin (A).

[14] A membrane electrode assembly comprising the polymer electrolyte membrane of any one of [1] to [13].

[15] A solid polymer electrolyte fuel cell comprising the membrane electrode assembly of [14].

Advantageous Effect

In accordance with the present disclosure, a polymer electrolyte membrane is provided which can achieve a favorable balance between a high elongation at break and a high gas barrier capability (e.g., the hydrogen gas barrier capability), and exhibits a high physical durability, as well as exhibiting a high chemical durability even under high temperature and low humidifying conditions, even when the polymer electrolyte membrane contains different resins that are mixed together.

DETAILED DESCRIPTION

Embodiments of a polymer electrolyte membrane, a membrane electrode assembly comprising this polymer electrolyte membrane, and a solid polymer electrolyte fuel cell comprising this membrane electrode assembly of the present disclosure (each may be simply referred to as "the present embodiment" hereinafter) will be described in detail.

[Polymer Electrolyte Membrane]

A polymer electrolyte membrane of the present embodiment comprises a perfluorosulfonic acid resin (A) (hereinafter, may be simply referred to as the "resin (A)"), wherein the polymer electrolyte membrane has a phase-separation structure having a phase where fluorine atoms are detected in majority and a phase where carbon atoms are detected in majority, in an image of a membrane surface observed under an SEM-EDX, and an average aspect ratio in an image of a membrane cross-section observed under the SEM is 1.5 or more and 10 or less.

The polymer electrolyte membrane of the present embodiment may further comprise an acidic group-containing aromatic hydrocarbon resin (B) (hereinafter, may be simply referred to as the "resin (B)"), and/or a compatibilizer for the perfluorosulfonic acid resin (A) and the acidic group-containing aromatic hydrocarbon resin (B) (hereinafter, may be simply referred to as the "compatibilizer (C)").

For each of the resin (A), the resin (B), and the compatibilizer (C), one type may be used alone, or two or more types may be used in combination.

We have found that a polymer electrolyte membrane of the present embodiment, for example, had higher elongation at break even when an aromatic hydrocarbon sulfonic acid resin was blended, and exhibited physical durability as well as achieving a favorable balance between a high elongation at break and a high gas barrier capability and exhibited a high chemical durability even under high temperature and low humidifying conditions, as compared to polymer electrolyte membranes that contained the resin (A) and had a phase-separation structure having a phase where fluorine atoms were detected in majority and a phase where carbon atoms were detected in majority in an image of a membrane surface observed under an SEM-EDX, and had average aspect ratios of less than 1.5 or more than 10 in an image of cross-sections of the membranes observed under the SEM.

—Perfluorosulfonic Acid Resin (A)—

Examples of the perfluorosulfonic acid resin (A) include polymers having a repeating unit represented by the following formula (1) and a repeating unit represented by the following formula (2):

  (1)

(in formula (1), $X^1$, $X^2$, $X^3$, and $X^4$ are each independently a hydrogen atom, a halogen atom, or a perfluoro alkyl group having a carbon number of 1 to 10, and at least one of $X^1$, $X^2$, $X^3$, and $X^4$ is a fluorine atom or a perfluoro alkyl group having a carbon number of 1 to 10); and

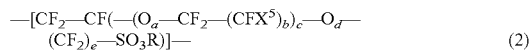  (2)

(in the formula (2), $X^5$ is a halogen atom or a perfluoro alkyl group having a carbon number of 1 to 4; and R is a hydrogen atom, an alkali metal atom such as a lithium atom, a sodium atom, or a potassium atom, or an amine such as $NH_4$, $NH_3R^1$, $NH_2R^1R^2$, $NHR^1R^2R^3$, or $NR^1R^2R^3R^4$ ($R^1$, $R^2$, $R^3$ and $R^4$ each independently represent an alkyl or aryl group having a carbon number of 1 to 10); and a is 0 or 1, b is 0 or 1, c is an integer of 0 to 8, and d is 0 or 1, and e is an integer of 0 to 8, with the proviso that b and e are not 0 at the same time).

In the case where the perfluorosulfonic acid resin has a plurality of repeating units represented by the above general formula (1) and/or a plurality of repeating units represented by the above general formula (2), the repeating units may be the same or may be different from each other.

The perfluorosulfonic acid resin (A) is preferably a compound having one or more of repeating units represented by the following general formulae (3) to (7):

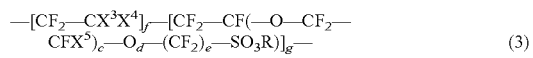  (3)

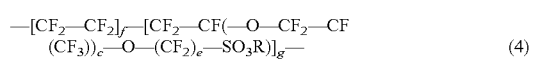  (4)

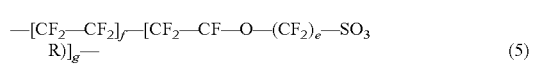  (5)

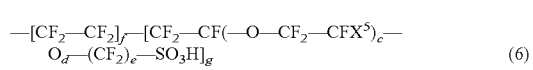  (6)

  (7)

(in the formulae (3) to (7), $X^3$, $X^4$, $X^5$, and R are the same as those in the formulae (1) and (2); c, d, and e are the same as those in the formulae (1) and (2); and $0 \leq f < 1$, $0 < g \leq 1$, and $f+g=1$, with the proviso that e is not 0 in the formulae (5) and (7)).

The perfluorosulfonic acid resin (A) may contain a constitutional unit other than repeating units represented by the above general formulae (1) and (2). Examples of such other constitutional units include constitutional units represented by the following general formulae (I) and (II), for example:

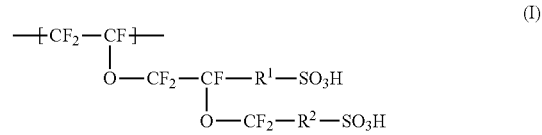  (I)

(in the formula (I), $R^1$ is a single bond or a dihydric perfluoro organic group having a carbon number of 1 to 6 (e.g., a perfluoro alkylene group having a carbon number of 1 to 6, for example); and $R^2$ is a dihydric perfluoro organic group having a carbon number of 1 to 6 (e.g., a perfluoro alkylene group having a carbon number of 1 to 6, for example)); and

  (II)

(in the formula (II), R is $-C_6H_4CN$, $-C_6F_4CN$, $-C_6H_5$, $-C_6F_5$, or $-OH$).

The perfluorosulfonic acid resin (A) is preferably a resin having a repeating unit represented by the formula (4) or (5), and more preferably a resin constituted only from a repeating unit represented by the formula (5), in view of enabling provision of a polymer electrolyte membrane that facilitates permeation of protons and has an even lower resistivity.

The perfluorosulfonic acid resin (A) can be prepared by synthesizing a precursor polymer, and then subjecting the precursor polymer to alkali hydrolysis or an acid treatment, for example.

The precursor polymer is exemplified by a polymer having $-SO_2Y$ (Y is a halogen atom) in place of $-SO_3R$ in the formula (2), for example.

The precursor polymer can be prepared by copolymerizing the following fluorinated olefinic compound and the sulfonic acid fluorinated vinyl compound described below, for example.

Examples of the fluorinated olefinic compound include compounds represented by the following formula (9):

  (9)

(in the formula (9), $X^1$, $X^2$, $X^3$, and $X^4$ are the same as those in the formula (1)).

Specific examples of the fluorinated olefinic compound include tetrafluoroethylene, hexafluoropropylene, trifluoroethylene, monochlorotrifluoroethylene, dichlorotrifluoroethylene, perfluorobutylethylene ($C_4F_9CH=CH_2$), perfluorohexylethylene ($C_6F_{13}CH=CH_2$), and perfluorooctylethylene ($C_8F_{17}CH=CH_2$). Of these, tetrafluoroethylene is preferable.

The above-described fluorinated olefinic compound may be used alone or in a combination of two or more.

Examples of the sulfonic acid fluorinated vinyl compound include compounds represented by the following formula (10):

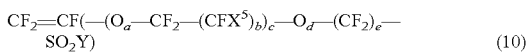

$$CF_2=CF(-(O_a-CF_2-(CFX^5)_b)_c-O_d-(CF_2)_e- SO_2Y) \quad (10)$$

(in the formula (10), $X^5$ is the same as that in the formula (2); Y is a halogen atom; and a, b, c, d, and e are the same as those in the formula (2), with the proviso that b and e are not 0 at the same time).

Specific examples of the sulfonic acid fluorinated vinyl compound include compounds represented by $CF_2=CF-O-(CF_2)_q-SO_2F$, $CF_2=CF-O-CF_2-CF(CF_3)-O-(CF_2)_q-SO_2F$, $CF_2=CF-(CF_2)_q-SO_2F$, and $CF_2=CF-(OCF_2CF(CF_3))_q-(CF_2)_{q-1}-SO_2F$.

In the above compounds, q is an integer of 1 to 8.

The precursor polymer can be prepared with a well-known copolymerization process, and examples thereof are as follows, for example.

(i) A process of reacting a sulfonic acid fluorinated vinyl compound and a fluorinated olefinic compound, both of which are gaseous, for polymerization in solution after the compounds are charged into a polymerization solvent such as a fluorinated hydrocarbon to make a solution (solution polymerization). The fluorinated hydrocarbon suitable in use is selected from a group consisting of compounds generically called "chlorofluorocarbons" such as, for example, trichlorotrifluoroethane and 1,1,1,2,3,4,4,5,5,5-decafluoropentane.

(ii) A process of reacting a sulfonic acid fluorinated vinyl compound and a fluorinated olefinic compound, both of which are gaseous, for polymerization without a solvent such as a fluorinated hydrocarbon where the sulfonic acid fluorinated vinyl compound also serves as a solvent (bulk polymerization).

(iii) A process of reacting a sulfonic acid fluorinated vinyl compound and a fluorinated olefinic compound, both of which are gaseous, for polymerization in solution after the compounds are charged into a water solution of a surfactant used as a polymerization solvent to make a solution (emulsion polymerization).

(iv) A process of reacting a sulfonic acid fluorinated vinyl compound and a fluorinated olefinic compound, both of which are gaseous, for polymerization in emulsion after the compounds are charged into a water solution of a surfactant and an auxiliary emulsifier such as an alcohol to make an emulsion (mini-emulsion polymerization or micro-emulsion polymerization).

(v) A process of reacting a sulfonic acid fluorinated vinyl compound and a fluorinated olefinic compound, both of which are gaseous, for polymerization in suspension after the compounds are charged into a water solution of a suspension stabilizer to make a suspension (suspension polymerization).

The precursor polymer has a melt mass flow rate (MFR) of preferably 0.01 g/10 min or more, more preferably 0.1 g/10 min or more, and even more preferably 0.3 g/10 min or more, and particularly preferably 1 g/10 min or more. The upper limit of the MFR is preferably 100 g/10 min or less, more preferably 50 g/10 min or less, even more preferably 10 g/10 min or less, and particularly preferably 5 g/10 or less. Control of the MFR in a range of 0.01 g/10 min or more and 100 g/10 min or less tends to improve forming process, such as film formation, of the polymer.

The MFR of the precursor polymer is measured according to JIS K7210. Specifically, an instrument having an orifice inner diameter of 2.09 mm and a length of 8 mm is used to measure the melt flow rate of fluorinated ion exchange resin precursors under a load of 2.16 kg and at a temperature of 270° C., as the MFR (g/10 min) of the precursor polymer.

The precursor polymer may be subjected to hydrolysis by immersing it in a basic reaction liquid at 10° C. or higher and 90° C. or lower for 10 seconds or longer and 100 hours or shorter, washed sufficiently with warm water or the like, and then subjected to an acid treatment, for example. The basic reaction liquid is preferably a water solution of a hydroxide of an alkali metal or an alkaline earth metal, such as potassium hydroxide or sodium hydroxide.

The acid treatment protonates the precursor polymer to yield a perfluorosulfonic acid resin.

—Acidic Group-Containing Aromatic Hydrocarbon Resin (B)—

Examples of the acidic group-containing aromatic hydrocarbon resin (B) include resins having a repeating unit derived from a hydrocarbon having an acidic group in the main chain. Of these, acidic group-containing polyphenylene ether (PPE), acidic group-containing polyetherketone (PEK), acidic group-containing polyetheretherketone (PEEK), acidic group-containing polyetheretherketone ketone (PEEKK), acidic group-containing polybenzimidazole (PBI), acidic group-containing polyphenylene sulfide (PPSd), acidic group-containing polyethersulfone (PES), acidic group-containing polyetherethersulfone (PEES), acidic group-containing polyphenylsulfone (PPSn), and the like are preferable, in view of a further improvement in the durability of a polymer electrolyte membrane.

Examples of the acidic group in the acidic group-containing aromatic hydrocarbon resin (B) include a sulfonic acid group, a carboxylic acid group, and a phosphoric acid group. Of these, a sulfonic acid group is preferable in view of enabling provision of a polymer electrolyte membrane having an even higher proton conductivity.

As used herein, the term "aromatic" compounds refer to heterocyclic unsaturated compounds, as well as homocyclic unsaturated compounds.

Examples of the acidic group-containing polyphenylene ether include resins in which aromatic rings form the main chain, and an acyl group bonded to an aromatic ring has an acidic group, such as a sulfonic acid group, a carboxylic acid group, or a phosphoric acid group. Specific examples include polymers having constituents represented by the following general formulae (11) and (12):

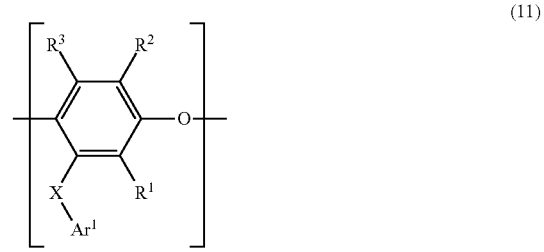

(11)

(in the formula (11), $R^1$ to $R^3$ are each independently at least one selected from the group consisting of a hydrogen atom, a halogen atom, an alkyl group, a fluorinated alkyl group, an allyl group, an aryl group, and a cyano group; X is a dihydric electron-withdrawing group; and $Ar^1$ is an aryl group that may be substituted with a non-acidic group); and

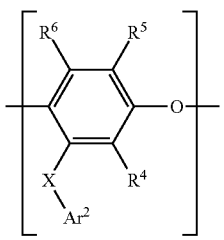

(in the formula (12), $R^4$ to $R^6$ are each independently at least one selected from the group consisting of a hydrogen atom, a halogen atom, an alkyl group, a fluorinated alkyl group, an allyl group, an aryl group, and a cyano group; X is dihydric electron-withdrawing group; and $Ar^2$ is an aryl group that is substituted with at least one acidic group selected from the group consisting of a sulfonic acid group, a carboxylic acid group, and a phosphoric acid group).

In the acidic group-containing polyphenylene ether, preferred modes of the formulae (11) and (12) are as follows.

The carbon numbers of the alkyl group and the fluorinated alkyl group in $R^1$ to $R^6$ are preferably 1 to 12 and more preferably 1 to 4.

The allyl group in $R^1$ to $R^6$ is preferably 2-propenyl group, 2-methyl-2-propenyl group, and 2-hexenyl group.

The aryl group in $R^1$ to $R^6$ (i.e., in the main chain) is preferably a phenyl group or benzyl group.

Examples of the dihydric electron-withdrawing group as X include —C(O)— (carbonyl group (keto group)), —S(O)— (sulfoxide), and —S(O)$_2$-(sulfonyl group), and —C(O)— (carbonyl group (keto group)) is preferable.

The aryl group in $Ar^2$ (i.e., in the side chain) is preferably a phenyl group, a naphthyl group, an anthracenyl group, or a benzyl group. The aryl group substituted with an acidic group in $Ar^2$ is preferably a sulfonated benzoyl group, a sulfonated naphthoyl group, and the like.

In the acidic group-containing polyphenylene ether, $Ar^1$ may be substituted with a non-acidic group. Furthermore, at least one substituent of the aromatic ring framework in $Ar^2$ is preferably a sulfonic acid group. Here, the location of the sulfonic acid group in the aromatic ring framework is not particularly limited. Furthermore, the number of bonding sites of a sulfonic acid group is not limited to one, and there may be two or three bonding sites.

In the acidic group-containing polyphenylene ether, selective incorporation of a sulfonic acid group on an aromatic ring that is not in the main chain of polyphenylene ether can prevent the sulfonic acid group from being removed. This leads to provision of an acidic group-containing polyphenylene ether that is thermally stable.

In the acidic group-containing polyphenylene ether, preferably, the ratio of the constituent represented by the general formula (11) is 60 to 95% by mole and the ratio of the constituent represented by the general formula (12) is 5 to 40% by mole, relative to the constituents represented by the general formulae (11) and (12), for the following reason. Note that the ratio of the constituent represented by the general formula (12) relative to the constituents represented by the general formulae (11) and (12) is also referred to as the "sulfonation ratio".

The sulfonation ratio within the aforementioned range gives a high proton conductivity to and helps to maintain a high strength of a solid polymer electrolyte membrane including the acidic group-containing polyphenylene ether.

The sulfonation ratio is preferably 5% by mole or more, more preferably 15% by mole or more, and particularly preferably 25% by mole or more in view of enhancing the power generation efficiency of a fuel cell including the resin in its solid polymer electrolyte membrane, and is preferably 40% by mole or less and more preferably 35% or less in view of reducing swelling of the solid polymer electrolyte membrane.

Unless otherwise stated, the sulfonation ratio of a resin refers to the sulfonation ratio of the resin after being dried at room temperature (e.g., 30° C.) for 24 hours.

The ion exchange capacity of the acidic group-containing polyphenylene ether is not specifically limited as long as a desired proton conductivity can be achieved, but is preferably 0.5 to 3.5 meq/g (milli-equivalent/g) and more preferably 1.2 to 2.5 meq/g for the same reasons as those for the sulfonation ratio.

The ion exchange capacity can be determined by the method that will be described below.

A resin that is sulfonated excessively is not preferable for use in a proton conducting membrane because the resin may have a reduced water resistance and may be subjected to dissolution or decomposition in water.

The ion exchange capacity can be modified by adjusting the amount of a sulfonating agent, the concentration of the sulfonating agent in a reaction solution, and/or the time and temperature of a reaction with the sulfonating agent. For example, for increasing the ion exchange capacity, the amount of the sulfonating agent may be increased and the reaction time to react with the sulfonating agent may be extended.

The structure of the acidic group-containing polyphenylene ether can be confirmed by determining presence or absence of absorption peaks of sulfonic acid groups near 1010 to 1080 cm' and near 1100 to 1230 cm' in an infrared absorption spectrum, for example.

The structure can also be confirmed by $^1$H-NMR, for example.

The process of producing the acidic group-containing polyphenylene ether is not particularly limited, and an exemplary process is a process comprising synthesizing a modified polyphenylene ether by incorporating a dihydric electron-withdrawing group and an aryl group to a base polyphenylene ether, and then synthesizing an acidic group-containing polyphenylene ether by incorporating a sulfonic acid group to the modified polyphenylene ether, for example.

The process of synthesizing the modified polyphenylene ether is not particularly limited, and an exemplary process is a process comprising incorporating an acyl group, particularly an acyl group having an aromatic hydrocarbon group, to the aromatic ring framework of the polyphenylene ether by means of a Friedel-Crafts acylation, for example.

More specifically, in a Friedel-Crafts acylation, polyphenylene ether is reacted with an acid halide or the like in the presence of a Lewis acid (metal halide) such as aluminum chloride or tin chloride.

Dichloromethane, chloroform, methylene chloride, or the like, is used as a reaction solvent.

The reaction conditions described in Li, Q.; Liu, L.; Liang, S.; Li, Q.; Jin, B.; Bai, R.; *Polym. Chem.*, 2014, 5, 2425-2432, may be employed.

Examples of the base polyphenylene ether preferably include, but are not particularly limited to, poly (2,6-dimethyl-1,4-phenylene ether), a block copolymer of poly (2,6-dimethyl-1,4-phenylene ether) and poly (2,3,6-trimethyl-1, 4-phenylene ether), and a mixture thereof, and a random copolymer of 2,6-dimethylphenol and 2,3,6-trimethylphenol.

Examples of the acid halide include, but are not particularly limited to, compounds represented by the following general formula (13):

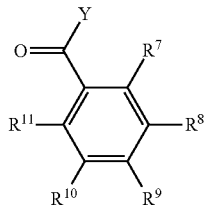

(13)

(in the formula (13), Y is a non-fluorine halogen atom; $R^7$ to $R^{11}$ are each independently a hydrogen atom, a halogen atom, an alkyl group, a fluorinated alkyl group, an allyl group, an aryl group, or a cyano group, wherein at least one of $R^7$ to $R^{11}$ is a hydrogen atom).

Other examples of the acid halide are compounds having, in place of the phenyl group, a polycyclic aromatic hydrocarbon group, such as a naphthyl group or an anthracenyl group, as the side chain aromatic hydrocarbon group bonded to the carbonyl group in the above general formula (13).

Further examples are compounds having, in place of the phenyl group, an aryl group (e.g., benzyl group) that enables coupling of a carbonyl group with the side chain aromatic hydrocarbon group having an alkyl group interposed therebetween, as the group bonded to the carbonyl group in the above general formula (13).

The acylation ratio by a Friedel-Crafts acylation is particularly preferably 100% by mole, but it is more preferably 90 to 100% by mole and preferably 85 to 100% by mole.

Note that acylation ratio can be determined by $^1$H-NMR.

The limiting viscosity of the polyphenylene ether is preferably 0.25 dL/g or more and more preferably 0.30 dL/g or more in view of easiness of separation from the solvent after incorporation of the sulfonic acid group and enhancing the heat resistance, and is preferably 1.45 dL/g or less and more preferably 0.70 dL/g or less in view of preventing an excessive increase in the viscosity of the solution upon the incorporation of the sulfonic acid group and enhancing the handleability upon stirring and feeding.

The limiting viscosity can be determined as follows. Specifically, 0.5 g of a modified polyphenylene ether is dissolved into chloroform to obtain 100 mL or more of two or more solutions having different concentrations (concentrations of 0.5 g/dL or less). The respective specific viscosities of the solutions with the different concentrations are measured at 30° C. using an Ubbelohde viscometer, and the limiting viscosity is determined by extrapolating the viscosity at a concentration of 0 from the relation between the specific viscosities and the concentrations.

An exemplary process of incorporating acidic groups entirely or partially to the modified polyphenylene ether is a process comprising reacting the modified polyphenylene ether with an acidifying agent such as a sulfonating agent (e.g., fuming sulfuric acid, sulfuric acid, or chlorosulfonic acid) in the absence or presence of a solvent.

For incorporating a sulfonic acid group, instead of the process of incorporating the sulfonic acid group using the sulfonating agent, a process may be employed in which a sulfonated metal salt, a sulfoester group, a sulfonyl chloride group, or the like is incorporated, and a sulfonic acid group is then incorporated by means of an ion exchange, de-esterification, hydrolysis, or the like.

A halogenated hydrocarbon, such as dichloroethane, tetrachloroethane, chloroform, and methylene chloride, may be used as the solvent.

The reaction temperature is, but not particularly limited to, typically −20 to 180° C. and preferably 0 to 100° C.

The reaction time is typically 0.5 to 48 hours and preferably 1 to 10 hours.

A sulfonic acid group-containing polyphenylene ether may be obtained by incorporating a sulfonic acid group by dissolving poly (2,6-dimethyl-1,4-phenylene ether) into chloroform, and dripping chlorosulfonic acid to this solution thereby inducing a reaction at room temperature, for example. As the sulfonation reaction progresses, the sulfonic acid group-containing polyphenylene ether becomes insoluble to chloroform, and precipitates as amorphous solids, which can be collected by filtration.

In the acidic group-containing polyphenylene ether, a sulfonic acid group is more readily incorporated into an aromatic ring framework in a side chain which is bound to the aromatic ring framework via an electron-withdrawing group, than the electron-rich aromatic ring framework of the main chain of the polyphenylene ether. This provides an effect in that the sulfonic acid group is less susceptible to thermal removal even under a high-temperature condition (e.g., at 170° C.). This effect increases the ion exchange capacity of the acidic group-containing polyphenylene ether after being stored under a high-temperature condition to be greater than the ion exchange capacity of a conventional sulfonic acid group-containing polyphenylene ether after being stored under a high-temperature condition.

The acidic group-containing polyphenylene ether may contain a constituent other than the constituents represented by the general formulae (11) and (12), and the other constituent, relative to the 100% by mole of the constituents represented by the general formulae (11) and (12) and the other constituent, is particularly preferably 0% by mole, but is more preferably 0 to 10% by mole and preferably 0 to 20% by mole.

The acidic group-containing polyetherketone may be exemplified by sulfonated polyetherketones having structures represented by the following general formulae, for example, and is preferably a sulfonated polyetherketone only constituted from the structure(s) represented by the following general formula(e):

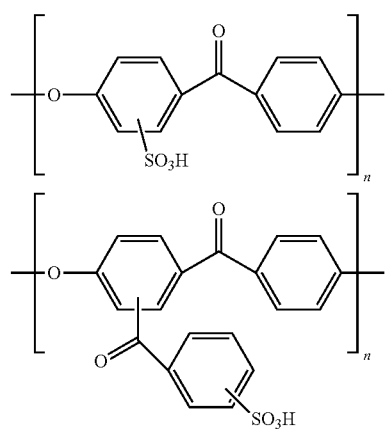

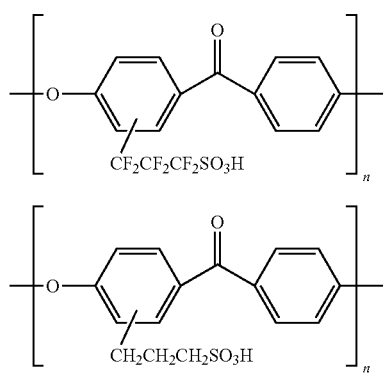

(in the above formulae, n represents an integer of 2 or more).

The acidic group-containing polyetheretherketone may be exemplified by sulfonated polyetheretherketones having structures represented by the following general formulae, for example, and is preferably a sulfonated polyetheretherketone only constituted from the structure(s) represented by the following general formula(e):

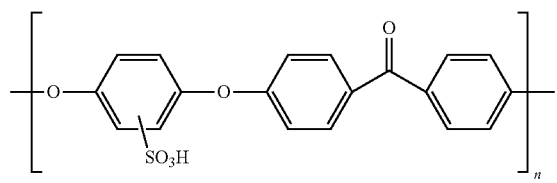

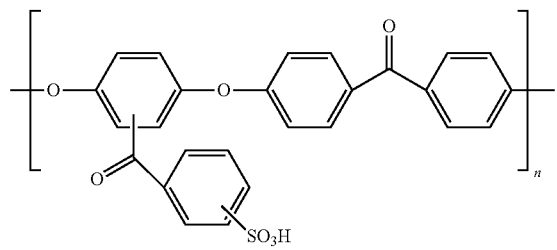

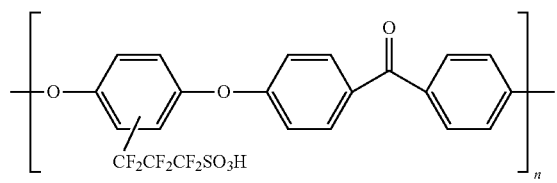

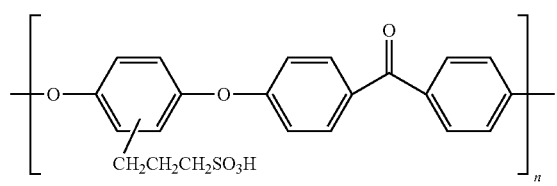

(in the above formulae, n represents an integer of 2 or more).

The acidic group-containing polyetheretherketone ketone may be exemplified by sulfonated polyetheretherketone ketones having structures represented by the following general formulae, for example, and is preferably a sulfonated polyetheretherketone ketone only constituted from the structure(s) represented by the following general formula(e):

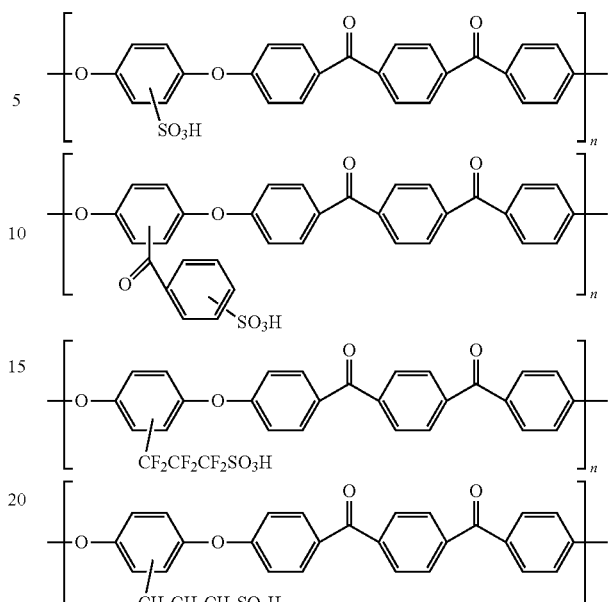

(in the above formulae, n represents an integer of 2 or more).

The acidic group-containing polybenzimidazole may be exemplified by sulfonated polybenzimidazoles having structures represented by the following general formulae, for example, and is preferably a sulfonated polybenzimidazole only constituted from the structure(s) represented by the following general formula(e):

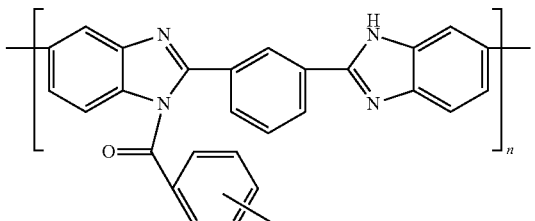

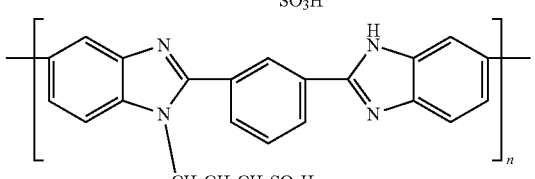

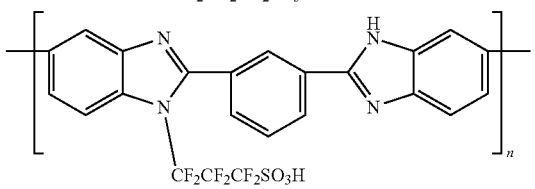

(in the above formulae, n represents an integer of 2 or more).

The acidic group-containing polyphenylene sulfide may be exemplified by sulfonated polyphenylene sulfides having structures represented by the following general formulae, for example, and is preferably a sulfonated polyphenylene sulfide only constituted from the structure(s) represented by the following general formula(e):

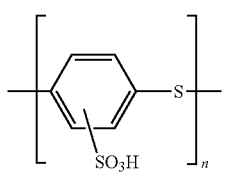

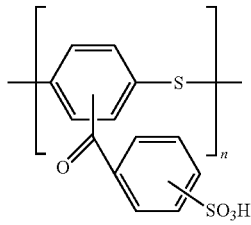

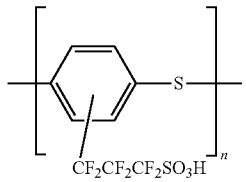

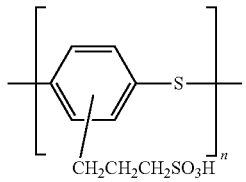

(in the above formulae, n represents an integer of 2 or more).

The acidic group-containing polyethersulfone may be exemplified by sulfonated polyethersulfones having structures represented by the following general formulae, for example, and is preferably a sulfonated polyethersulfone only constituted from the structure(s) represented by the following general formula(e):

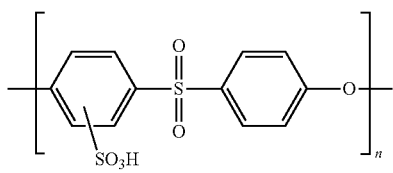

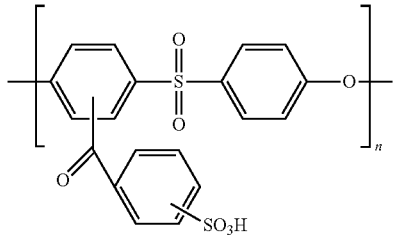

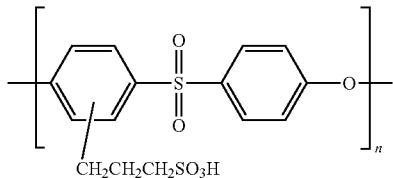

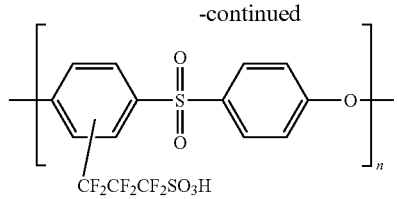

(in the above formulae, n represents an integer of 2 or more).

The acidic group-containing polyetherethersulfone may be exemplified by sulfonated polyetherethersulfones having structures represented by the following general formulae, for example, and is preferably a sulfonated polyetherethersulfone only constituted from the structure(s) represented by the following general formula(e):

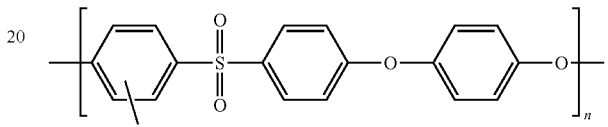

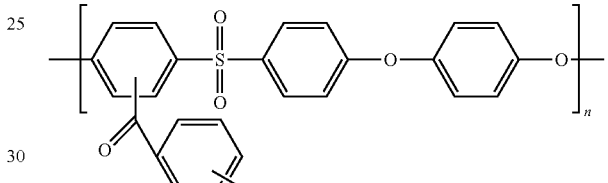

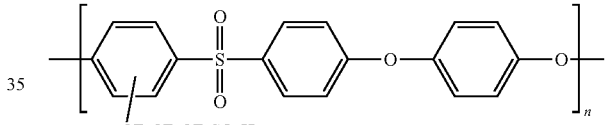

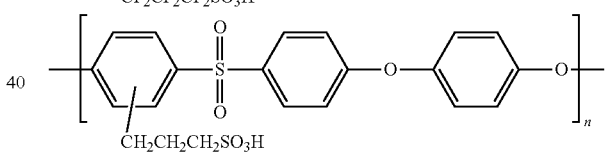

(in the above formulae, n represents an integer of 2 or more).

The acidic group-containing polyphenylsulfone may be exemplified by sulfonated polyphenylsulfones having structures represented by the following general formulae, for example, and is preferably a sulfonated polyphenylsulfone only constituted from the structure(s) represented by the following general formula(e):

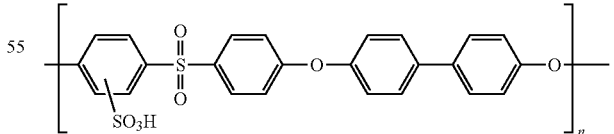

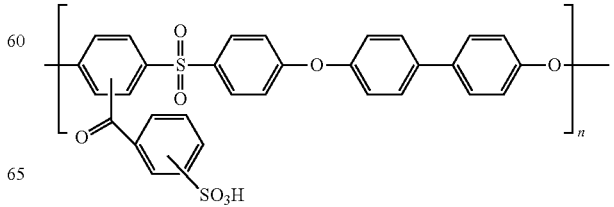

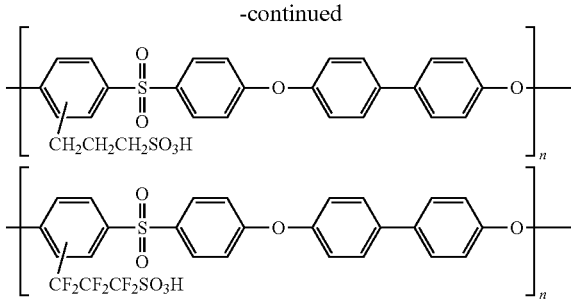

(in the above formulae, n represents an integer of 2 or more).

In the polymer electrolyte membrane in the present embodiment, the mass ratio of the resin (A) and the resin (B) (mass of the resin (A)/mass of the resin (B)) is preferably 90/10 to 50/50, more preferably 85/15 to 60/40, and even more preferably 80/20 to 70/30, in view of the elongation at break and the gas barrier capability.

—Compatibilizer (C)—

In this embodiment, the polymer electrolyte membrane preferably contains a compatibilizer (C) for making the resin (A) and the resin (B) to be compatible to each other, for facilitating mixing of the resin (A) and the resin (B).

Other than adding the compatibilizer (C), compatibilization can also be achieved by any means as long as compatibilization of the resin (A) and the resin (B) is achieved, such as by adding a hydrocarbon-based segment to the resin (A) or adding a fluorine-based segment to the resin (B).

In this specification, a polymer obtained by adding a hydrocarbon-based segment to the resin (A) and a polymer obtained by adding a fluorine-based segment to the resin (B) are not regarded as compatibilizers (C), but as the resin (A) and the resin (B), respectively.

Examples of the compatibilizer (C) include a monomer, an oligomer, and a polymer having a fluorine-based segment and a hydrocarbon-based segment in a single chain (e.g., polyvinylidene fluoride); and a compound (e.g., oxide or hydroxide) having a multivalent metal atom, such as cerium, calcium, magnesium, aluminum, tungsten, copper, nickel, and iron.

Exemplary processes of adding a hydrocarbon-based segment to the resin (A) include a process in which a part of C—F bonds in the perfluorosulfonic acid resin (A) are converted into C—H bonds, and a process in which a hydrocarbon-based segment is incorporated to a side chain of the perfluorosulfonic acid resin (A), for example. Any of other processes that can add a hydrocarbon-based segment to the resin (A) may also be used.

Exemplary processes of adding a fluorine-based segment to the resin (B) include a process in which a part of C—H bonds in the resin (B) are converted into C—F bonds, and a process in which a fluorine-based segment is incorporated to a side chain of the resin (B), for example. For instance, resins in which at least one site in $R^7$ to $R^{11}$ (preferably, all sites in $R^7$ to $R^{11}$) in the above general formula (13) are substituted with fluorine atom(s), resins (e.g., modified polyphenylene ether) that are modified with a perfluoro alkoxyalkane, and the like are exemplified. Any of other preferred processes can also be used.

The content of the resin (C) in the polymer electrolyte membrane of the present embodiment (100 parts by mass) is preferably 0.01 to 10.0 parts by mass and more preferably 0.1 to 5.0 parts by mass.

—Additional Component (D)—

The polymer electrolyte membrane of the present embodiment may include an additional component (D) such as a nitrogen-containing aliphatic basic polymer or a nitrogen-containing aromatic basic polymer, in addition to the resin (A), the resin (B), and the compatibilizer (C).

An example of the nitrogen-containing aliphatic basic polymer is polyethyleneimine.

Examples of the nitrogen-containing aromatic basic polymer include polyaniline; and heterocyclic compounds, such as polybenzimidazole, polypyridine, polypyrimidine, polyvinylpyridine, polyimidazole, polypyrrolidine, polyvinylimidazole, and polypyrrole. Of these, polybenzimidazole is preferable in view of enabling provision of a polymer electrolyte membrane having a function to capture radicals generated in the polymer and having a further higher durability.

Examples of polybenzimidazole include compounds represented by the general formula (14) or (15) and poly 2,5-benzimidazole represented by the general formula (16):

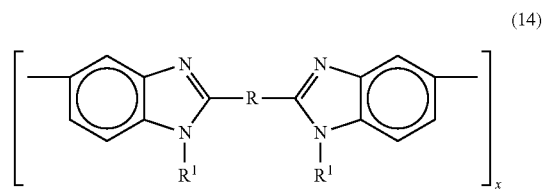

(in the formula (14), R is

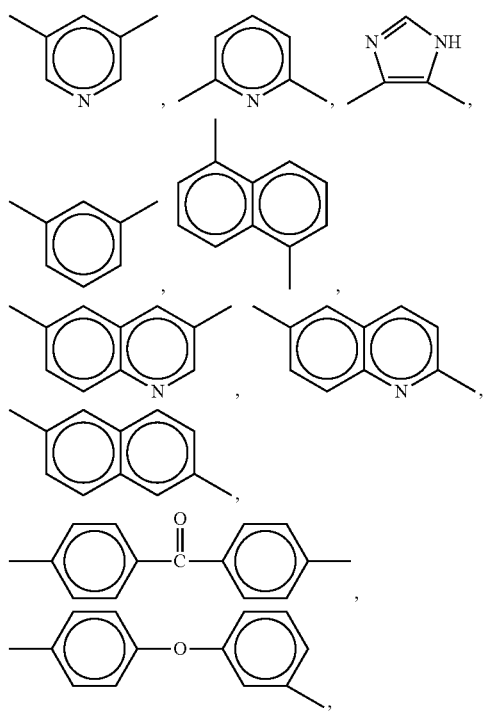

an alkylene group, or a dihydric group of a fluoro alkylene group, 10 are each independently a hydrogen atom, an alkyl group, a phenyl group, or a pyridyl group, and x is an integer of 10 or more and $1.0 \times 10^7$ or less);

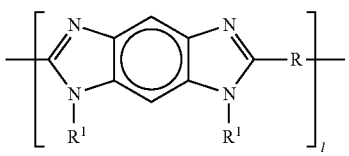

(15)

(in the formula (15), R and $R^1$ may be the same groups as R and $R^1$ in the formula (14), and 1 is an integer of 10 or more and $1.0 \times 10^7$ or less); and

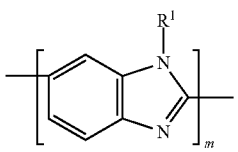

(16)

(in the formula (16), $R^1$ may be the same group as $R^1$ in the formula (14), and m is an integer of 10 or more and $1.0 \times 10^7$ or less).

Of these, particularly preferable is poly [2,2'-(m-phenylene)-5,5'-bibenzimidazole] represented by the following formula (17):

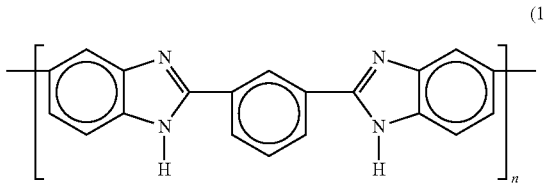

(17)

(in the formula (17), n is an integer of 10 or more and $1.0 \times 10^7$ or less).

A polymer as the additional component (D) can be produced by polymerization processes described in well-known literatures (e.g., see *Experimental Chemistry Course 28 Polymer Synthesis* $4^{th}$ *Edition*, The Chemical Society of Japan (ed.), Maruzen).

The weight average molecular weight of the polymer as the additional component (D) is, but not particularly limited to, preferably 10,000 to 1,000,000, more preferably 20,000 to 100,000, and even more preferably 50,000 to 100,000.

The weight average molecular weight can be determined by gel permeation chromatography (GPC).

The intrinsic viscosity of the polymer as the additional component (D) is preferably 0.1 to 10.0 dL/g, more preferably 0.3 to 5.0 dL/g, and even more preferably 0.5 to 1.0 dL/g.

The intrinsic viscosity can be determined by the following equation, from the viscosity ηP (mPa·s) of a polymer solution prepared by dissolving the polymer into dimethylacetamide, the viscosity ηS (mPa·s) of dimethylacetamide, and the concentration Cp (g/dL) of the polymer solution. The term "viscosity" as used herein refers to a viscosity determined by a cone-plate rotational viscometer (E-type viscometer) at 25° C., for example.

$$\text{Intrinsic viscosity} = \ln(\eta P/\eta S)/Cp$$

(in the formula, ln is the symbol of natural logarithm).

Furthermore, the polymer electrolyte membrane of the present embodiment may contain a thioether group-containing compound, an epoxy group-containing compound, and/or the like, as an additional component (D).

Examples of the thioether group-containing compound include compounds having a structure of —(R—S)$_n$— (in the formula, S represents a sulfur atom, R represents a hydrocarbon group, and n is an integer of 1 or more), for example. Specific examples thereof include dialkylthioethers such as dimethylthioether, diethylthioether, dipropylthioether, methylethylthioether, and methylbutylthioether; cyclic thioethers such as tetrahydrothiophene and tetrahydropyran; and aromatic thioethers such as methylphenyl sulfide, ethylphenyl sulfide, diphenyl sulfide, and dibenzyl sulfide.

The thioether group-containing compound may be a monomer, or a polymerized compound such as polyphenylene sulfide (polyphenylene sulfide without an acidic group). Of these, the thioether compound is preferably a polymerized compound with n of 10 or more (oligomer or polymer), and more preferably a polymerized compound with n of 1,000 or more in view of durability.

The thioether group-containing compound is preferably polyphenylene sulfide (polyphenylene sulfide without an acidic group) in view of the chemical stability. Polyphenylene sulfide contains preferably 70% by mole or more and more preferably 90% by mole or more of a paraphenylene sulfide framework.

The process of producing the polyphenylene sulfide as the additional component (D) includes, for example, polymerization of a halogenated aromatic compound (p-dichlorobenzene etc.) in the presence of sulfur and sodium carbonate; polymerization of a halogenated aromatic compound in the presence of sodium sulfide or sodium hydrosulfide and sodium hydroxide in a polar solvent; polymerization of a halogenated aromatic compound in the presence of hydrogen sulfide and sodium hydroxide or sodium aminoalkanoate in a polar solvent; and self-condensation of p-chlorothiophenol. Among these, preferred is a process in which sodium sulfide and p-dichlorobenzene are reacted in an amide-based solvent such as N-methylpyrrolidone or dimethylacetamide, or a sulfone-based solvent such as sulfolane.

Specifically, the process of producing the polyphenylene sulfide as the additional component (D) include processes described, for example, in U.S. Pat. No. 2,513,188B, JP S44-27671B, JP S45-3368B, JP S52-12240B, JP S61-225217A, U.S. Pat. No. 3,274,165B, GB1160660B, JP S46-27255B, Belgian Patent No. 29437, and JP H5-222196A, and there can be used methods of prior arts exemplified in these literatures.

The oligomer extraction amount of polyphenylene sulfide as the additional component (D) by methylene chloride is preferably 0.001 to 0.9% by mass, more preferably 0.001 to 0.8% by mass, and even more preferably 0.001 to 0.7% by mass.

Here, the oligomer extraction amount by methylene chloride within such a range means that the amount of oligomer (about 10 mer to 30 mer) in polyphenylene sulfide is small. The oligomer extraction amount within such a range is preferable because bleed-out is less likely to occur during a membrane formation.

The oligomer extraction amount by methylene chloride can be determined by the following method. Specifically, 5 g of polyphenylene sulfide powder is added to 80 mL of methylene chloride, and Soxhlet extraction is performed for 4 hours. Then, after being cooled to room temperature, the extracted methylene chloride solution is transferred to a weighing bottle. The vessel used in the extraction is washed three times with 60 mL of methylene chloride in total, and the liquid used for washing is collected in the weighing bottle. Then, the weighing bottle is heated to about 80° C. to evaporate methylene chloride in the weighing bottle, and the residue is weighed. The proportion of amount of oligomer in polyphenylene sulfide is determined from the weight of the residue.

The content of the —SX group (S represents a sulfur atom, and X represents an alkali metal atom or a hydrogen atom) in polyphenylene sulfide as the additional component (D) is preferably 10 to 10,000 µmol/g, more preferably 15 to 10,000 µmol/g, and even more preferably 20 to 10,000 µmol/g.

The content of the —SX group within such a range indicates presence of many reaction active sites. Polyphenylene sulfide having the concentration of —SX group within such a range improves the miscibility of polyphenylene sulfide with a polymer electrolyte, which increases the dispersibility, thereby achieving an even higher durability under high temperature and low humidifying conditions.

The —SX group can be quantified by the following method. Specifically, polyphenylene sulfide powder is dried at 120° C. for 4 hours. Thereafter, 20 g of the dried polyphenylene sulfide powder is added to 150 g of N-methyl-2-pyrrolidone, and is stirred vigorously at room temperature for 30 minutes such that powder aggregate is eliminated to form a slurry state. The slurry is filtrated, and the residue is then washed with 1 L of warm water at 80° C. The washing was repeated 7 times. After the resultant filter cake is slurrified with 200 g of pure water again, the pH of the slurry is adjusted to 4.5 by adding 1-N hydrochloric acid. Then, after being stirred for 30 minutes at 25° C., the slurry is filtrated and washed with 1 L of warm water at 80° C. The washing was repeated 6 times. The resultant filter cake is slurrified with 200 g of pure water again, and is titrated with a 1-N sodium hydroxide solution. The amount of —SX group in polyphenylene sulfide is determined from the amount of sodium hydroxide consumed.

The melt viscosity (a value acquired by holding at 300° C. and a load of 196 N for 6 minutes using a flow tester whose L/D (L: orifice length, D: orifice diameter) was 10/1) at 320° C. of polyphenylene sulfide as the additional component (D) is preferably 1 to 10,000 poises, and more preferably 100 to 10,000 poises in view of workability upon forming.

Polyphenylene sulfide as the additional component (D) can also be used which is prepared by introducing an acidic functional group to a benzene ring, and substituting the acidic functional group incorporated with a metal salt or an amine salt. Preferable metal salts are, alkali metal salts such as sodium salt and a potassium salt, and alkaline earth metal salts such as a calcium salt.

Examples of the epoxy group-containing compound as the additional component (D) include a low-molecular-weight epoxy group-containing compound, a homopolymer or copolymer of an epoxy group-containing unsaturated monomer, and an epoxy resin, for example. Of these, a homopolymer or copolymer of an epoxy group-containing unsaturated monomer and an epoxy resin are preferable because compounds with higher molecular weight can be handled more easily at high temperatures.

The low-molecular-weight epoxy group-containing compound is preferably a compound that is solid or liquid at 200° C. Specific examples include 1,2-epoxy-3-phenoxypropane, N-(2,3-epoxypropyl) phthalimide, 3,4-epoxytetrahydrothiophene-1,1-dioxide, glycidyl 4-nonylphenyl ether, glycidyl tosylate, and glycidyl trityl ether.

Examples of the epoxy group-containing unsaturated monomer constituting a homopolymer or copolymer of the epoxy group-containing unsaturated monomer is not particularly limited and any epoxy group-containing unsaturated monomer may be used. Examples thereof include glycidyl methacrylate, glycidyl acrylate, vinyl glycidyl ether, glycidyl ether of hydroxyalkyl (meth)acrylate, glycidyl ether of polyalkylene glycol (meth)acrylate, and glycidyl itaconate. Among these, preferred is glycidyl methacrylate.

In the case where a copolymer including an epoxy group-containing unsaturated monomer is used, an unsaturated monomer to be copolymerized with the epoxy group-containing unsaturated monomer is preferably an aromatic vinyl compound such as styrene, a vinyl cyanide monomer such as acrylonitrile, vinyl acetate, (meth)acrylic acid ester, or the like. Examples of the copolymer obtained by copolymerizing such a copolymerizable unsaturated monomer include a styrene-glycidyl methacrylate copolymer, a styrene-glycidyl methacrylate-methyl methacrylate copolymer, and a styrene-glycidyl methacrylate-acrylonitrile copolymer, for example.

Particularly, a copolymer containing an epoxy group-containing unsaturated monomer and a styrene monomer preferably contains at least 65% by mass or more of the styrene monomer in view of improving the dispersibility. In addition, it preferably contains 0.3 to 20% by mass, more preferably 1 to 15% by mass, and even more preferably 3 to 10% by mass of the epoxy group-containing unsaturated monomer.

Examples of the epoxy resin include a cresol novolac type epoxy resin, a bisphenol A type epoxy resin, a bisphenol F type epoxy resin, a bisphenol S type epoxy resin, a hydantoin type epoxy resin, a biphenyl type epoxy resin, an alicyclic epoxy resin, a triphenylmethane type epoxy resin, and a phenol novolak type epoxy resin, for example. One selected from these may be used, or two or more of these may be used in mixture. Of these, a cresol novolac type epoxy resin and a bisphenol A type epoxy resin are preferable, and a cresol novolac type epoxy resin is more preferable, in view of the compatibility with the polyphenylene ether resin.

—Properties of Polymer Electrolyte Membrane—

The polymer electrolyte membrane of the present embodiment has certain morphology in images observed under an SEM-EDX and SEM.

The polymer electrolyte membrane of the present embodiment has a phase having an average aspect ratio of 1.5 or more and 10 or less in an image of a membrane cross-section observed under an SEM (may also be referred to as "cross-sectional SEM"). The average aspect ratio is preferably 2 or more and 8 or less, and more preferably 2.5 or more and 6 or less. The average aspect ratio within such a range helps to achieve both a high gas barrier capability and a high elongation at break, as well as improving the physical durability.

This average aspect ratio may be the average aspect ratio of the phase constituting islands in the phase-separation structure, or may be the average aspect ratio of islands where carbon atoms are detected in majority. Particularly, the average aspect ratio is preferably the average aspect ratio of phases constituting islands where carbon atoms are detected in majority, such as islands containing the resin (B) and islands constituted only from the resin (B).

Here, the term "membrane cross-section" refers to the cross-section of the polymer electrolyte membrane in the direction perpendicular to the surface thereof (cross-section in the thickness direction). The morphology of a membrane cross-section can be observed by preparing the membrane cross-section of a polymer electrolyte membrane by dissecting the polymer electrolyte membrane using a microtome or the like after embedding it with an epoxy adhesive or the like, and observing the cross-section under an SEM. As will be described in the EXAMPLES section, a cross-sectional SEM can also be observed by coating a sample with platinum, osmium, or the like by evaporation (or dying the sample). An evaporation (or dying) enables observations of the morphology of at least two phases, and the aspect ratio can be calculated by determining the diameters (long diameter and short diameter) of dispersed phases. In determining the aspect ratio, preferably, the short diameter is a diameter in the thickness direction of the polymer electrolyte membrane and the long diameter is the diameter in the direction perpendicular to the thickness direction. Specifically, measurements can be performed by a method described in the EXAMPLES section below.

The average aspect ratio of 1.5 or more and 10 or less may be achieved by using a copolymer of a fluorine containing monomer and a fluorine-free monomer as the perfluorosulfonic acid resin (A) as described above, or adding another fluorine-free component (e.g., an acidic group-containing aromatic hydrocarbon resin (B) described below), for example.

It is sufficient to observe a phase having the average aspect ratio within the above-described range in at least one membrane cross-section of the polymer electrolyte membrane of the present embodiment. However, observations of two or more membrane cross-sections are preferable because the uniformity of the membrane that affects the elongation at break and the physical durability can be observed more reliably.

The polymer electrolyte membrane of the present embodiment has a phase-separation structure that has a phase where fluorine atoms are detected in majority and a phase where carbon atoms are detected in majority in an image of a membrane surface observed under the SEM-EDX. One or both of the membrane surfaces may have such a phase-separation structure. However, both of the membrane surfaces preferably have a phase-separation structure because such a membrane has even better elongation at break and physical durability. As used therein, the term "membrane surface" observed under the SEM-EDX refers to a surface of a layer that contains the resin (A) and has a phase-separation structure.

A phase where fluorine atoms are detected in majority and a phase where carbon atoms are detected in majority can be identified by obtaining an image of the surface using an SEM having an energy dispersive X-ray spectrometer (EDX) attached thereto, and carrying out an element mapping of the SEM image.

Generally, the perfluorosulfonic acid resin forms a phase where fluorine atoms are detected in majority. A perfluorosulfonic acid resin can form a phase where carbon atoms are detected in majority when it is copolymerized with a fluorine atom-free comonomer (an α-olefin such as ethylene and propylene) or is blended with hydrocarbon resin (such as the (B) component described below). In the case where a hydrocarbon resin is blended, the hydrocarbon resin may be aromatic or aliphatic, but an aromatic hydrocarbon resin is preferable in view of the gas barrier capability. In addition, macromolecules, such as graphene oxide and oxidized carbon nanotubes may also be used. Among aromatic hydrocarbon resins, an acidic group-containing aromatic hydrocarbon resin (B) is preferable in view of achieving both good gas barrier capability and proton conductivity.

Note that the term "phase where fluorine atoms are detected in majority" refers to a region in which fluorine is the most abundant element detected by an SEM-EDX under conditions described in the EXAMPLES section below, and may be a region in which the amount of fluorine atoms detected by the SEM-EDX is 10% by mass or more.

Furthermore, the term "phase where carbon atoms are detected in majority" refers to a region in which carbon is the most abundant element detected by an SEM-EDX under conditions described in the EXAMPLES section below, and may be a region in which the amount of carbon atoms detected by the SEM-EDX is 10% by mass or more.

Furthermore, the term "having a phase-separation structure" means that at least one phase where fluorine atoms are detected in majority and at least one phase where carbon atoms are detected in majority are observed.

The phase-separation structure may also have a phase in which other atoms are detected in majority, other than the phase where fluorine atoms are detected in majority and the phase where carbon atoms are detected in majority. Particularly, the phase-separation structure is preferably constituted only from a phase where fluorine atoms are detected in majority, and a phase where carbon atoms are detected in majority.

In the polymer electrolyte membrane of the present embodiment, preferably, the phase-separation structure is a sea-island structure. The phase of an island is more preferably a phase where carbon atoms are detected in majority, even more preferably a phase where carbon atoms are detected in majority, such as a phase containing the resin (B) or a phase constituted only from the resin (B), and particularly preferably a phase constituted from the resin (B), in view of the gas barrier capability. Furthermore, phases of islands are preferably dispersed densely and finely.

In the polymer electrolyte membrane of the present embodiment, the proportion of the relative standard deviation of the carbon-fluorine peak intensity ratio (peak intensity of carbon atoms/peak intensity of fluorine atoms) in an image of at least one membrane surface observed under an SEM-EDX at a magnification of ×1,500, and the relative standard deviation of the carbon-fluorine peak intensity ratio in an image of that surface observed under the SEM-EDX at a magnification of ×150 (relative standard deviation at ×1,500/relative standard deviation at ×150) is preferably 0.20 or more and 5.0 or less, more preferably 0.50 or more and 2.0 or less, and even more preferably 0.80 or more and 1.2 or less. When the proportion of the relative standard deviations is within such a range, a phase where carbon atoms are detected in majority is uniformly and finely dispersed in the phase-separation structure, and thus both an even higher gas barrier capability and an even higher elongation at break are achieved.

The proportion of the relative standard deviations can be determined by the method described in the EXAMPLES section below.

The proportion of the relative standard deviations falls within such a range preferably on one membrane surface and more preferably on both of the membrane surfaces.

In the polymer electrolyte membrane of the present embodiment, preferably, the average carbon-fluorine peak intensity ratio in an image of a membrane surface observed under the SEM-EDX at a magnification of ×1,500 is 0.50 or more and 20 or less and the hydrogen permeability coefficient at 80° C. and in a RH of 30% is $5.0\times10^{-9}$ cc·cm/cm²·s·cmHg or less. More preferably, the average carbon-fluorine peak intensity ratio is 1.0 or more and 10 or less and the hydrogen permeability coefficient is $3.0\times10^{-9}$ cc·cm/cm²·s·cmHg or less, and even more preferably, the average carbon-fluorine peak intensity ratio is 2.0 or more and 5.0 or less and the hydrogen permeability coefficient is $1.0\times10^{-9}$ cc·cm/cm²·s·cmHg or less. The average carbon-fluorine peak intensity ratio and the hydrogen permeability coefficient within such ranges can further improve the balance between the gas barrier capability and the elongation at break.

The hydrogen permeability coefficient can be measured by the method described in the EXAMPLES section below.

The number of points to be observed under the SEM-EDX on a 5-mm square measurement sample piece of the polymer electrolyte membrane is five: four in any four corners and one at the center. Increasing the number of points to be observed can enhance the reliability of the relative standard deviation.

The average carbon-fluorine peak intensity ratio in an image at a magnification of ×1,500 falls within such a range preferably on either of the membrane surfaces and more preferably on both of the membrane surfaces.

—Method of Forming Polymer Electrolyte Membrane—

The polymer electrolyte membrane of the present embodiment is preferably formed using a solution containing the resin (A) as a raw material with a method described below. Note that the "solution containing the resin (A)" refers to a solution in which the resin (A) is dissolved or finely dispersed in a solvent.

In the case where the polymer electrolyte membrane of the present embodiment contains both the resin (A) and the resin (B), the polymer electrolyte membrane is preferably produced through a step of mixing a solution containing the resin (A) and a solution containing the resin (B), so that the resin (A) and the resin (B) are uniformly and finely dispersed in the membrane.

Here, the solution containing the resin (A) is preferably a solution containing only the resin (A) as a resin component. Furthermore, the solution containing the resin (B) is preferably a solution containing only the resin (B) as a resin component.

The solution containing the resin (A) and the solution containing the resin (B) both preferably have the peak tops of the scattering diameters within a range of 10 to 200 µm in dynamic light scattering measurements. With this range, in the mixed solution of the solution containing the resin (A) and the solution containing the resin (B), aggregates of the resin (A) and aggregates of the resin (B) are spaced apart with regular intervals, and the resin (A) and the resin (B) are uniformly and finely dispersed in the membrane. As a result, the good gas barrier capability and the good elongation at break can be balanced in a favorable manner. The peak top of the scattering diameter of the solution containing the resin (A) may be the same as or different from the peak top of the scattering diameter of the solution containing the resin (B).

The dynamic light scattering measurement can be carried out by the method described in the EXAMPLES section below.

In the case where the polymer electrolyte membrane of the present embodiment contains the resin (A), the resin (B), and the compatibilizer (C), preferably, a solution containing the compatibilizer is used in addition to the above solutions and the method includes a step of mixing the solution containing the resin (A), the solution containing the resin (B), and a solution containing the compatibilizer (C). The order of mixing is preferably such that the solution containing the resin (A) and the solution containing the resin (B) are mixed, and then the solution containing the compatibilizer (C) is added and mixed. This facilitates entry of the compatibilizer (C) into gaps at regular spacing between aggregates of the resin (A) and aggregates of the resin (B), and the resin (A) and the resin (B) are thus further uniformly and finely dispersed in the membrane. As a result, the good gas barrier capability and the good elongation at break can be balanced in a favorable manner at even higher level. Note that the solution containing the compatibilizer (C) may be a solution in which the compatibilizer (C) is uniformly dissolved or a dispersion in which the compatibilizer (C) is merely dispersed.

The solution containing the compatibilizer (C) is preferably a solution only containing the compatibilizer (C) as a compatibilizer for the resin (A) and the resin (B).

The mixed solution of the solution containing the resin (A), the solution containing the resin (B), and the solution containing the compatibilizer (C) preferably has a transmittance of 90% T or more at a wavelength of 800 nm in a UV measurement. The transmittance is more preferably 95% T or more and even more preferably 98% T or more. A transmittance within such a range helps to make determination as to whether the solution is finely dispersed or not, and to fabricate a finely dispersed membrane having a phase-separation structure with smaller islands. Note that the device and the measurement conditions for UV measurements are described in the EXAMPLES section. UV measurements can be carried out by the method described in the EXAMPLES section below.

The solid content concentration of the compatibilizer relative to the weight (100% by mass) of the mixed solution of the solution containing the resin (A), the solution containing the resin (B), and the solution containing the compatibilizer (C) is preferably 0.001% by mass or more and less than 1% by mass, more preferably 0.005% by mass or more and less than 0.5% by mass, and is even more preferably 0.01% by mass or more and less than 0.1% by mass.

Examples of a method of forming the polymer electrolyte membrane of the present embodiment include a method comprising preparing a cast liquid by mixing the solution containing the resin (A), the solution containing the resin (B), and/or the solution containing the compatibilizer (C) and further mixing a liquid medium containing a protic solvent if necessary; casting the cast liquid on a support to apply a liquid coating on the support; and removing the liquid medium from the liquid coating to thereby form a polymer electrolyte membrane, for example. Note that the cast liquid preferably contains the protic solvent that has been added upon preparation of the solution containing the resin (A), the solution containing the resin (B), and/or the solution containing the compatibilizer (C).

The cast liquid may be an emulsion (where liquid particles are dispersed in a liquid as colloid particles or particles larger than the colloid particles and emulsified), a suspension (where solid particles are dispersed in a liquid as colloid particles or particles that can be seen under a microscope), a colloidal liquid (where macromolecules are dispersed), a micellar liquid (lyophilic colloid dispersion system formed of many small molecules associated with an intermolecular force), or a combination thereof.

Preferably, the cast liquid contains a liquid medium containing a protic solvent. The cast liquid which contains a liquid medium containing a protic solvent enables formation of a polymer electrolyte membrane in which the resin (A) and the resin (B) are dispersed further uniformly and finely.

Such a protic solvent is exemplified by a solvent having a functional group that can donate a proton, and examples thereof include water, alcohols (e.g., methanol, ethanol, propanol, and isopropanol), and phenols. Of these water is preferable.

The amount of the protic solvent added is preferably 0.5 to 99.5% by mass, more preferably 1 to 90% by mass, and even more preferably 10 to 60% by mass, relative to 100% by mass of the liquid medium in the cast liquid.

One protic solvent may be used, or two or more protic solvents may be used in mixture. In particular, the solvent is preferably a mixed solvent of water and an alcohol, and more preferably a mixed solvent of water and ethanol of a ratio of water/ethanol of 3/1 to 1/3 (volume ratio) or a mixed solvent of water and isopropanol of a ratio of water/isopropanol of 3/1 to 1/3 (volume ratio).

Preferably, the liquid medium in the cast liquid further contains a non-protic solvent. Here, the term "non-protic solvent" refers to a solvent other than protic solvents described above, and examples thereof include N,N-dimethylformamide, N,N-dimethylacetamide, N-methylpyrrolidone, dimethyl sulfoxide, acetone, and methyl ethyl ketone. Of these, N,N-dimethylformamide, N,N-dimethylacetamide, N-methylpyrrolidone, and dimethyl sulfoxide are preferable.

One non-protic solvent may be used, or two or more of non-protic solvents may be used in mixture.

The amount of the non-protic solvent added is preferably 99.5 to 0.5% by mass, more preferably 99 to 10% by mass, and even more preferably 90 to 40% by mass, relative to 100% by mass of the liquid medium in the cast liquid.

The content of the liquid medium in the cast liquid is preferably 20.000 to 99.989% by mass, more preferably 40.000 to 99.895% by mass, and even more preferably 75.000 to 98.990% by mass, relative to 100% by mass of the cast liquid.

The content of the resin (A) in the cast liquid is preferably 0.10 to 30.00% by mass, more preferably 0.15 to 20.00% by mass, and even more preferably 0.15 to 10.00% by mass, relative to 100% by mass of the cast liquid.

The content of the resin (B) in the cast liquid is preferably 0.10 to 30.00% by mass, more preferably 0.15 to 20.00% by mass, and even more preferably 0.15 to 10.00% by mass, relative to 100% by mass of the cast liquid.

In the case where the cast liquid contains a compatibilizer, the mass ratio of the combined amount of the resin (A) and the resin (B) to the amount of the compatibilizer (C) (total mass of the resin (A) and the resin (B): mass of the compatibilizer (C)) is, but not particularly limited to, preferably 99.99:0.01 to 90.0:10.0 and more preferably 99.9:0.1 to 95.0:5.0.

Such a cast liquid facilitates removal of the liquid medium, and enables formation of a polymer electrolyte membrane wherein the resin (A) and the resin (B) are dispersed further uniformly and finely, exhibits further greater gas barrier capability and elongation at break, which leads to an even higher chemical durability.

The cast liquid can be prepared by adding a resin solution (hereinafter, referred to as "precursor solution L") of the compatibilizer (C) dissolved in a non-protic solvent (e.g., dimethylacetamide) to a resin solution (hereinafter, referred to as "precursor solution M") of the resin (A) and the resin (B) dissolved in a non-protic solvent (e.g., dimethylacetamide), and stirring the mixed liquid; and then further adding a resin solution (hereinafter, referred to as "precursor solution N") containing the resin (A) dissolved in a protic solvent, and stirring the mixed liquid, for example.

Examples of a method of preparing the precursor solution L include a method comprising charging an autoclave with the compatibilizer (C) and a non-protic solvent, and carrying out a heat treatment at 40 to 300° C. for 10 minutes to 100 hours, for example.

The content percentage of the compatibilizer (C) in the precursor solution L is preferably 0.001% by mass or more and less than 1% by mass, more preferably 0.005% by mass or more and less than 0.5% by mass, even more preferably 0.01% by mass or more and less than 0.1% by mass, per 100% by mass of the precursor solution L. A content percentage of the compatibilizer (C) within such a range facilitates entry of the finely dispersed compatibilizer into gaps at regular spacing between the resin (A) and the resin (B), and the resin (A) and the resin (B) are thus even further uniformly and finely dispersed in the membrane. As a result, the good gas barrier capability and the good elongation at break can be balanced in a favorable manner at further higher level.

Examples of a method of preparing the precursor solution M include a method comprising charging an autoclave with the resin (A), the resin (B), and a non-protic solvent, and carrying out a heat treatment at 40 to 300° C. for 10 minutes to 100 hours, or a method comprising solvent displacement of the precursor solution N (by removing a protic solvent by evaporation, and then adding the non-protic solvent), for example.

The content percentage of the resin (A) and the resin (B) in the precursor solution M is preferably 0.01 to 50% by mass, more preferably 0.1 to 30% by mass, and even more preferably 1 to 10% by mass, per 100% by mass of the precursor solution M.

The precursor solution L can be prepared by charging an autoclave with the resin (A) and a protic solvent, and carrying out a heat treatment at 40 to 300° C. for 10 minutes to 100 hours. The "solution" as used herein includes a micellar liquid where the resin (A) is dispersed as micelles.

The content percentage of the resin (A) in the precursor solution N is preferably 0.1 to 50% by mass, more preferably 0.1 to 30% by mass, and even more preferably 1 to 10% by mass, per 100% by mass of the precursor solution N.

In the case where the precursor solution L and the precursor solution M prepared in the aforementioned manner are mixed together with a well-known mixing technique and the concentration of the resin (A) is adjusted, the precursor solution N is added and the mixture is stirred. Further, a condensation is carried out if necessary. Thus a cast liquid can be prepared.

Then, the cast liquid is casted on a support to apply a liquid coating on the support, and the liquid medium is removed from the liquid coating to thereby form a polymer electrolyte membrane.

The casting can be achieved by a method by employing a gravure roll coater, a natural roll coater, a reverse roll coater, a knife coater, a dip coat, or the like, or a well-known coating method, such as spraying or spin coating.

Examples of the support preferably used for casting include a glass plate; plastic films such as a polyethylene terephthalate film, a polytetrafluoroethylene film, and a polyimide film; metal foils, and substrates of alumina or Si. The support is removed from the polymer electrolyte membrane during a formation of a membrane electrode assembly when required. Alternatively, a polymer electrolyte membrane including a reinforcing body (porous membrane) can be produced by impregnating, with a cast liquid, a porous membrane that has been prepared by elongating a PTFE membrane disclosed in JPH5-75835B, and then removing the liquid medium. Alternatively, a polymer electrolyte membrane reinforced with fibrilized fibers, as disclosed in JP S53-149881A and JP S63-61337B, can be produced by adding the fibrilized fibers made from PTFE or the like to a cast liquid, casting the cast liquid, and then removing the liquid medium.

The thus obtained polymer electrolyte membrane may be subjected to a heat treatment (annealing) at 40 to 300° C., preferably 80 to 200° C. (the liquid medium is completely removed by the heat treatment and the structure of components in the polymer electrolyte membrane is stabilized). Furthermore, an acid treatment may be carried out with an acid, such as hydrochloric acid or nitric acid, if necessary, for exploiting the intrinsic ion exchange capacity (when a part of ion exchange groups in the polymer electrolyte membrane is substituted with a salt, the ion exchange groups are regenerated by the acid treatment). Additionally, a stretch orientation can be imparted by a lateral mono-axial tenter or simultaneous bi-axial tenter.

The content of the resin (A) in the polymer electrolyte membrane is preferably 10 to 95% by mass and more preferably 20 to 80% by mass per 100% by mass of the polymer electrolyte membrane, in view of enabling provision of a polymer electrolyte membrane having an even higher proton conductivity.

The content of the resin (B) in the polymer electrolyte membrane is preferably 5 to 90% by mass and more preferably 20 to 80% by mass per 100% by mass of the polymer electrolyte membrane, in view of enabling provision of a polymer electrolyte membrane having an even higher durability.

The mass ratio of the resin (B) relative to 100 parts by mass of the resin (A) in the polymer electrolyte membrane is preferably 5 to 900 parts by mass and more preferably 25 to 400 parts by mass, in view of enabling provision of a polymer electrolyte membrane that has even higher gas barrier capability and durability and exhibits even higher cell voltage.

The content of the compatibilizer (C) in the polymer electrolyte membrane is preferably 0.01 to 10.0% by mass and more preferably 0.10 to 5.0% by mass per 100% by mass of the polymer electrolyte membrane, in view of further improving the compatibility of the resin (A) and the resin (B) and enabling provision of a polymer electrolyte membrane having a further higher durability.

The resin (A) and the resin (B) are preferably dispersed uniformly in the polymer electrolyte membrane in view of the gas barrier capability, the durability, and the cell voltage.

The polymer electrolyte membrane of the present embodiment may be a laminate of multiple layers, and is preferably a polymer electrolyte membrane constituted only from a layer containing the resin (A). Further, the polymer electrolyte membrane of the present embodiment preferably comprises a layer containing the resin (A) and the resin (B) and a layer containing the resin (A), and more preferably a laminate of two layers constituted only from a layer containing the resin (A) and the resin (B) and a layer containing the resin (A).

Furthermore, the polymer electrolyte membrane of the present embodiment may be a laminate of layers containing the resin (A) and the resin (B) that are the same or different from each other.

In the case where the polymer electrolyte membrane of the present embodiment is a laminate, at least one surface layer (preferably both surfaces) is preferably a layer containing at least the resin (A), more preferably a layer containing at least the resin (A) and the resin (B), and even more preferably a layer containing the resin (A), the resin (B), and the compatibilizer (C).

Surprisingly, we found that the polymer electrolyte membrane of the present embodiment exhibited a significantly improved durability, a further excellent gas barrier capability, and an even higher cell voltage, as compared to a laminate of a layer of the resin (A) and a layer of the resin (B).

Although a detailed mechanism is unknown, in the layer containing the resin (A) and the resin (B) in the polymer electrolyte membrane of the present embodiment, presumably, hydrocarbon resin parts contribute to the gas barrier capability and acidic groups contribute to the cell voltage in the resin (B). Additionally, the layer containing the resin (A) and the resin (B) contains the resin (A), and thus the layer exhibits excellent proton conductivity and durability. Surprisingly, the layer containing the resin (A) and the resin (B) provides significant effects that are superior to a combination of the respective effects of the resin components.

In the polymer electrolyte membrane of the present embodiment, preferably, a gas barrier layer is the layer containing the resin (A) having an excellent proton conductivity and the resin (B) having an excellent gas barrier capability, and a conductive layer is the layer containing the resin (A) having the excellent proton conductivity.

The constituents in each layer in the polymer electrolyte membrane of the present embodiment can be identified by a Fourier transform infrared spectrophotometer, for example.

In the polymer electrolyte membrane of the present embodiment, in a measurement of the cross-section in the thickness direction of the polymer electrolyte membrane by a Fourier transform infrared spectrophotometer, preferably, a peak derived from C—F bonds appeared near 1000 to 1200 cm$^{-1}$ is observed across the entire region of the membrane cross-section; and peaks derived from C—H bonds appeared near 1400 to 1600 cm$^{-1}$ and 2900 to 3100 cm$^{-1}$ are observed in a region including the layer containing at least the resin (A) and the resin (B) in the cross-section, wherein the intensities of the peaks derived from C—H bonds appeared in the layer containing the resin (A) and the resin (B) are stronger than the intensities of the peaks derived from C—H bonds in the layer containing the resin (A) (layer not containing the resin (B)).

Here, the peak derived from C—F bonds appeared near 1000 to 1200 cm$^{-1}$ is exemplified by a peak derived from the resin (A), for example. The peaks derived from C—H bonds appeared near 1400 to 1600 cm$^{-1}$ and 2900 to 3100 cm$^{-1}$ are exemplified by peaks derived from the resin (B), for example.

In the polymer electrolyte membrane of the present embodiment, in a measurement of a cross-section in the thickness direction of the polymer electrolyte membrane by the Fourier transform infrared spectrophotometer, peaks derived from C—H bonds appeared near 1400 to 1600 cm$^{-1}$ and near 2900 to 3100 m$^{-1}$ and peaks derived from —SO$_3$H near 1010 to 1080 cm$^{-1}$ and near 1100 to 1230 cm$^{-1}$ are preferably observed in a region including the layer containing at least the resin (A) and the resin (B).

In the polymer electrolyte membrane of the present embodiment, the thickness of the layer containing the resin (A) and the resin (B) is preferably equal to or smaller than the thickness of the layer containing the resin (A).

The ion exchange capacity per 1 g of the polymer electrolyte membrane is, but not particularly limited to, preferably 0.50 to 4.00 meq/g, more preferably 0.83 to 4.00 meq/g, and even more preferably 1.00 to 1.50 meq/g. A higher ion exchange capacity further increases the proton conductivity under high temperature and low humidifying conditions, and a higher output can be obtained from a fuel cell comprising the polymer electrolyte membrane during operation.

The ion exchange capacity can be measured by the following method. First, a polymer electrolyte membrane that has been cut into a piece of about 10 cm² is vacuum dried at 110° C. and the dry weight W (g) is measured. This polymer electrolyte membrane is immersed in 50 mL of a saturated NaCl water solution at 25° C. to cause H⁺ to be disassociated. Then, a neutralization titration is carried out with a 0.01-N sodium hydroxide water solution using phenolphthalein as an indicator, and the milli-equivalent M (meq) of NaOH consumed in the neutralization is calculated. The ion exchange capacity (meq/g) is determined by dividing the resultant value of M by the weight W. The equivalent mass EW, which represents the dry mass (in grams) of 1 equivalent of ion exchange groups, is determined by dividing W by M and multiplying the quotient by 1,000.

The polymer electrolyte membrane of the present embodiment may comprise a reinforcing layer that is prepared by impregnating a fine porous membrane with a polymer electrolyte.

Examples of the material used for the fine porous membrane include, but are not particularly limited to, polyolefin resins such as polyethylene, polypropylene, ethylene-propylene copolymer, and polytetrafluoroethylene copolymers of fluorinated olefins (e.g., tetrafluoroethylene) and olefins (e.g., ethylene and propylene); polysiloxanes such as polysiloxane; methacrylate resins such as polymethyl methacrylate (PMMA); styrenic resins such as polystyrene, acrylonitrile-styrene copolymer (AS resin), and acrylonitrile-butadiene-styrene copolymer (ABS resin); polyamide; polyimide (PI); polyetherimide (PEI); polyamideimide; polyester imide; polycarbonate (PC); polyacetal; polyarylene ether such as polyphenylene ether (PPO); polyphenylene sulfide (PPS); polyarylate; polyaryl; polysulfone; polyethersulfone (PES); polyurethanes; polyester resins such as polyethylene terephthalate (PET); polyetherketone such as polyetheretherketone (PEEK) and polyetherketoneketone (PEKK); polyacrylic esters such as polybutyl acrylate and polyethyl acrylate; polyvinyl esters such as polybutoxymethylene; polysulfides; polyphosphazenes; polytriazines; polycarboranes; polynorbornene; epoxy resins; polyvinyl alcohols; polyvinylpyrrolidone; polydienes such as polyisoprene and polybutadiene; polyalkenes such as polyisobutylene; vinylidene fluoride resins; hexafluoropropylene resins; and hexafluoroacetone resins.

The thickness of the polymer electrolyte membrane in the present embodiment is preferably 1 to 50 μm, more preferably 3 to 25 μm, and even more preferably 5 to 15 μm.

The polymer electrolyte membrane of the present embodiment can be used as a component and the like of a membrane electrode assembly and a solid polymer electrolyte fuel cell.

(Membrane Electrode Assembly)

A membrane electrode assembly of the present embodiment comprises the above-described polymer electrolyte membrane and electrode catalyst layers.

A unit in which two electrode catalyst layers, namely, an anode and a cathode, are bonded to the two surfaces of the polymer electrolyte membrane is called a membrane electrode assembly (hereinafter, may be referred to as an "MEA"). A unit in which each of gas diffusion layers forming a pair is bonded to an outer side of the electrode catalyst layer facing each other may also be called the MEA. The MEA of the present embodiment is required to have a composition similar to that of a known MEA except that the polymer electrolyte membrane of the present embodiment is employed as the polymer electrolyte membrane.

The electrode catalyst layer is composed of catalytic metal particles, a conductive carrier agent supporting the catalytic metal particles, and an optional water repellent agent.

The catalyst metal may be any metal capable of promoting oxidation of hydrogen and reduction of oxygen, and examples thereof include one or more selected from the group consisting of platinum, gold, silver, palladium, iridium, rhodium, ruthenium, iron, cobalt, nickel, chromium, tungsten, manganese, vanadium, and alloys thereof. Among these, platinum is preferable.

As the method of producing an MEA, a known production method can be used using the polymer electrolyte membrane of the present embodiment and examples thereof include the following method. First, a binder ion exchange resin for an electrode is dissolved in a mixed solution of alcohol and water. Platinum-carrying carbon as an electrode substance is dispersed in the mixed solution to prepare a paste. A certain amount of the paste is applied to polytetrafluoroethylene (PTFE) sheets and dried. Next, a pair of PTFE sheets are arranged so that the coated surfaces face each other, and the polymer electrolyte membrane is sandwiched therebetween and hot pressed at a temperature of 100° C. to 200° C. to join them together through transfer and thus produce an MEA. The electrode binder is typically used in the form of a solution of ion exchange resin in a solvent (alcohol, water, etc.), but the polymer electrolyte of the present embodiment can be used as an electrode binder and is preferably used in view of durability. MEAs may be produced by the method disclosed in *JOURNAL OF APPLIED ELECTROCHEMISTRY*, 22 (1992) pp. 1-7, for example.

(Solid Polymer Electrolyte Fuel Cell)

A solid polymer electrolyte fuel cell of the present embodiment comprises the membrane electrode assembly described above.

The thus-obtained MEA, which may be the MEA having a structure in which each of the gas diffusion electrodes in pair is formed on the outer side of the electrode catalyst layer facing each other, forms the solid polymer electrolyte fuel cell in combination with components used in typical solid polymer electrolyte fuel cells such as a bipolar plate and a backing plate. Such a solid polymer electrolyte fuel cell is required to have a structure similar to that of a known type of fuel cell except that the above MEA is employed.

The term "bipolar plate" refers to a plate formed of a composite material of graphite and a resin or a metal or the like whose surface has a groove for allowing passage of a fuel or a gas such as an oxidizing agent. The bipolar plate has a function to transfer electrons to an external load circuit, and a function as a flow path to feed the fuel or the oxidizing agent to the vicinity of the electrode catalyst. By interposing the MEA between such bipolar plates and laminating in plural, the solid polymer electrolyte fuel cell according to the present embodiment is produced.

The solid polymer electrolyte fuel cell of the present embodiment can be used for fuel cell vehicles, home fuel cells, and the like, for example.

EXAMPLES

The present disclosure will be described hereinafter based on Examples, but it is not limited to the following examples.

(1) Observation under SEM-EDX (1-1) Formation of Phase-Separation Structure

A sample of 5-mm square was cut out from an arbitrary location of a polymer electrolyte membrane using a craft knife. One surface of the polymer electrolyte membrane was coated with platinum and/or osmium by evaporation, and the membrane surface was observed under an SEM apparatus (trade name: SU-8220 manufactured by Hitachi High-Technologies Corporation) and an EDX device (trade name: QUANTAX Flat QUAD manufactured by Bruker Corporation) with magnifications of ×150 and then ×1,500. The number of point to observe the cut-out sample of 5-mm square were five: four in the four corners and one at the center. The transverse and longitudinal lengths of areas observed were 60 μm and 80 μm at a magnification of ×150, and 600 μm and 800 μm at a magnification of ×1,500 including the center of the image observed at a magnification of ×150. The energy resolutions were 126 eV for the Mn Kα line, 51 eV for the C Kα line, and 60 eV for the F Kα line. The mapping of C and F and the peak intensity ratio (average) of the entire image obtained were determined in EDX measurements.

Upon making determinations on phase-separation structures, a sample was determined as having a sea-island phase-separation structure when sea-island phase-separation structures were confirmed at all of five observation points.

(1-2) Average Carbon-Fluorine Peak Intensity Ratio

A carbon-fluorine peak intensity ratio was determined as the peak intensity ratio of C and F in an image of a membrane surface observed under an SEM-EDX at a magnification of ×1,500. The measurement was carried out at five points, as in (1-1) described above. The average carbon-fluorine peak intensity ratio was determined by averaging the carbon-fluorine peak intensity values at 5 points.

(1-3) Proportion of Relative Standard Deviation of Carbon-Fluorine Peak Intensity Ratio Carbon-fluorine peak intensity ratios at 5 points were measured at ×1,500 and ×150 according the above method in (1-2).

For each magnification, the standard deviation of the carbon-fluorine peak intensity ratios at the five points was calculated, and the relative standard deviation was determined by dividing the resultant standard deviation by the average carbon-fluorine peak intensity ratio (the average calculated in (1-2)). The proportion of the relative standard deviation of a carbon-fluorine peak intensity ratio at a magnification of ×1,500 and the relative standard deviation of a carbon-fluorine peak intensity ratio at a magnification of ×150 (relative standard deviation at ×1,500/relative standard deviation at ×150) was calculated by dividing the relative standard deviation at a magnification of ×1,500 by the relative standard deviation at a magnification of ×150. The proportion of 1 indicates the highest dispersibility.

(2) Average Aspect Ratio

The both surfaces of a polymer electrolyte membrane were embedded with an epoxy adhesive. The polymer electrolyte membrane was then placed in an ultramicrotome (trade name: EM UC7 manufactured by Leica Microsystems), and was dissected with a glass cutting blade and a diamond cutting blade. The polymer electrolyte membrane was placed such that the cut surface extended as perpendicular to the membrane plane direction as possible, with respect to the cutting direction by the cutting blade. The resultant membrane cross-section was coated with platinum and/or osmium by evaporation, and was observed under the SEM in the manner similar to the SEM-EDX observation.

Twenty islands were sampled arbitrarily in the image observed under the cross-sectional SEM. The ratio of the lengths of long axis and short axis (long axis/short axis) of each island were measured, and the average of the ratios of the 20 islands was determined an average aspect ratio. In each sample, the long axis extended in the membrane plane direction, and the short axis extended in the thickness direction. In the membrane cross-section, islands in the phase-separation structure were sampled, and those in layers that did not have phase-separation structures and particles in the reinforcing layer were excluded from the sampling.

(3) Hydrogen Permeability Coefficient

The hydrogen permeability coefficient was measured as an indicator for the hydrogen barrier property of a polymer electrolyte membrane as follows. A flow-type gas permeability measuring device (trade name: GTR-30XFAFC manufactured by GTR Tec Corporation) was used, and the flow rate of gas supplied was set to 10 cc/min for test gas (hydrogen) and 10 cc/min for carrier gas (argon). The pressure was a normal and equal pressure, and the temperature and humidity were 80° C. and 30% in RH.

The hydrogen gas permeated through the polymer electrolyte membrane from the test gas side to the carrier gas side was introduced into a gas chromatograph (trade name: G2700TF manufactured by Yanaco Analytical Systems Inc.) to quantify the gas permeation amount.

The gas permeability coefficient P (cc·cm/cm$^2$·s·cmHg) was determined from the following equation, where X represents the gas permeation amount (cc), k represents the correction factor (=1.0), T represents the thickness (cm) of the polymer electrolyte membrane, A represents the permeation area (cm$^2$), D represents the metering tube passing time (sec), and p represents the oxygen partial pressure (cmHg):

$$P=(X \times k \times T/(A \times D \times p))$$

A smaller value of the calculated hydrogen permeability coefficient indicated a better hydrogen barrier property.

(4) Peak Top of Scattering Diameter in Dynamic Light Scattering

The respective peak tops of the scattering diameters of a solution containing a resin (A) and a solution containing a resin (B), used to produce a polymer electrolyte membrane, were measured by dynamic light scattering as follows. The liquid composition of the solution containing the resin (A) measured was adjusted by condensation or dilution such that the concentrations of the solid content and water became 2.5% by mass and 97.5% by mass, respectively. The liquid composition of the solution containing the resin (B) measured was adjusted by condensation or dilution such that the concentrations of the solid content and ethanol became 2.5% by mass and 97.5% by mass, respectively. Dynamic light scattering measurements were carried out using a particle size analyzing system ELS-Z2 Plus manufactured by OTSUKA ELECTRONICS Co., LTD. Specifically, a measurement sample placed in a disposable cell was irradiated with semiconductor laser light of 30 mW and 658 nm, and the intensities (photons/second) of scattered light at 160° were measured 200 times cumulatively, to determine the peak top of the scattering diameter (μm) of the measurement sample. The result was evaluated as "G" (good) when the peak tops of the scattering diameters of both the solution containing the resin (A) and the solution containing the resin (B) were within a range of 10 to 200 μm, or evaluated as "B" (bad) when the peak top of the scattering diameter of at least one of the solutions was not within a range of 10 to 200 μm.

(5) Transmittance in UV Measurement

In order to determine the extent of fine dispersion in a solution, a cast liquid was prepared by mixing a solution containing a resin (A), a solution containing a resin (B), and a solution containing a compatibilizer (C) at a proportion described in the Examples. The cast liquid was condensed such that the solid content concentration became 10% by mass. A UV measurement at a wavelength of 800 nm was carried out to determine the transmittance (% T) of light at that wavelength. The UV measurements were carried out using a spectrometer V-550 manufactured by JASCO Corporation.

(6) Elongation at Break

An elongation at break, as one indicator of the mechanical intensity of a polymer electrolyte membrane, was measured as follows. Using a tension tester TENSILON (manufactured by A&D Company Limited), a stress-strain curve was determined under a condition of a sample length of 50 mm and a tensile speed of 300 mm/min at an ambient temperature of 23° C. and in a RH of 50%. The tensile elongation (%) was determined from the elongation at a point of break. The measurements were carried out 4 times, and the averaged value was used for evaluation.

(7) Chemical Durability

An accelerated OCV test was carried out as follows to evaluate the chemical durability of a polymer electrolyte membrane in an accelerated manner. Here, "OCV" stands for open circuit voltage.

(7-1) Preparation of Electrode Catalyst Ink

A perfluorosulfonic acid polymer solution of 20% by mass (trade name: SS700C/20 manufactured by Asahi Kasei Corp., equivalent weight (EW): 740) and an electrode catalyst (trade name: TEC10E40E manufactured by Tanaka Kikinzoku Hanbai K.K., amount of supported platinum: 36.7% by weight) were blended at a ratio of platinum/perfluorosulfonic acid polymer of 1/1.15 (by mass). Then, ethanol was added so that the solid content (sum of the amounts of the electrode catalyst and the perfluorosulfonic acid polymer) was 11% by mass. The mixture was stirred using a homogenizer (manufactured by As One Corp.) at 3,000 rpm for 10 minutes. Thereby, an electrode catalyst ink was obtained.

(7-2) Preparation of MEA

The electrode catalyst ink was applied to both surfaces of the polymer electrolyte membrane using an automatic screen printer (trade name: LS-150 manufactured by Newlong Seimitsu Kogyo Co., Ltd.) such that the platinum amount on the anode side was 0.2 mg/cm' and the platinum amount on the cathode side was 0.3 mg/cm', and then the ink was dried and solidified at 140° C. for 5 minutes. Thereby, a MEA was obtained.

(7-3) Fabrication of Single Fuel Cell

Gas diffusion layers (trade name: GDL35BC manufactured by MFC Technology) were stacked on the respective electrodes of the MEA, and then gaskets, bipolar plates, and backing plates were stacked thereon. Thereby, a single fuel cell was obtained.

(7-4) OCV Test

The above single fuel cell was set to a tester (fuel cell evaluation system 890CL manufactured by TOYO Corporation) to carry out an OCV durability test.

The condition of the OCV test was a cell temperature of 95° C. using a humidifying bottle at 50° C. (RH of 25%), and hydrogen gas and air gas were supplied to the anode side and the cathode side, respectively, at a flow rate of 50 cc/min for each gas. The anode and cathode sides were not pressurized (they were under the atmospheric pressure).

(7-5) Determination on Degradation

The amount of hydrogen leakage was measured using a mico-gas chromatograph (trade name: CP-4900 manufactured by VARIAN) every 20 hours after the test was initiated. When the amount of hydrogen leakage became 1000 ppm or more, the membrane was considered to be broken and the test was terminated. The duration (hours) of the test from the start to the end of the test was used as an indicator of the chemical durability.

A membrane having a longer duration until it broke in the OCV test had better chemical durability.

(8) Physical Durability

An accelerated dry-wet cycle test was carried out as follows for evaluating the physical durability of a polymer electrolyte membrane in an accelerated manner. Note that "dry" means the condition where a gas was supplied without humidification whereas "wet" means the condition where the gas was supplied with humidification.

Initially, a single fuel cell was fabricated in the similar manner to (7-1) to (7-3) described above.

(8-4) Dry and Wet Cycle Test

The above single fuel cell was set to a tester (fuel cell evaluation system 890CL manufactured by TOYO Corporation) to carry out a dry-wet cycle durability test.

The Dry and wet cycle test condition was as follows: gases were supplied at a flow rate of 500 cc/min alternatingly without humidification (RH of 0%) for 5 minutes and with humidification using a humidifying bottle of 80° C. (RH of 100%) for 1 minute. One cycle consisted of the start of the dry condition to end of the subsequent wet condition. Hydrogen gas was supplied to the anode side and nitrogen gas was supplied to the cathode side. The anode and cathode sides were not pressurized (they were under the atmospheric pressure).

(8-5) Determination on Degradation

A leakage current of hydrogen was measured at every 1,700 cycles after the test was started using an electrochemical test system SI1280B manufactured by Solartron Analytical. When the hydrogen leakage current became 10 mA/cm$^2$ or more, the membrane was considered to be broken and the test was terminated. The cycle count from the start to the end of the test was used as an indicator of the physical durability. When the monitored voltage sharply dropped before the cycle count reached 1,700, the leakage current of hydrogen at that time was measured.

A membrane having a greater dry and wet cycle count until it broke had better physical durability.

Example 1

(1) Preparation of Cast Liquid

The perfluorosulfonic acid resin solution AS14 described in Example 5 in WO2015/002073 was used as a precursor solution A-1 in this example.

Sulfonated benzoyl group-containing polyphenylene ether (SBzPPE) represented by the following general formula (18) was synthesized as follows.

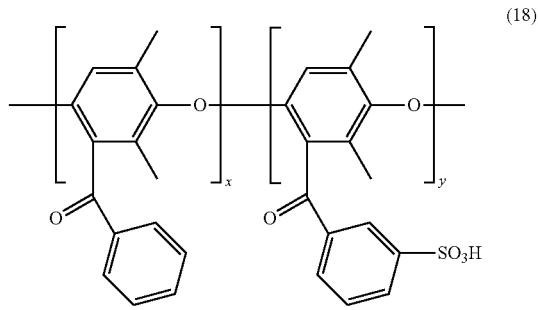

(18)

A 5-L 4-neck flask that was flushed with argon gas was charged with 90 g of poly (2,6-dimethyl-1,4-phenylene ether) and 2250 mL of dichloromethane, and the contents were stirred. To the resultant polyphenylene ether solution, 750 mL of a dichloromethane solution of 109 g of aluminum chloride and 104 g of benzoyl chloride was dripped over 45 minutes at room temperature. After the dripping completed, the reaction solution was heated with a mantle heater to cause a reaction at 40° C. for 6 hours. Thereafter, the reaction solution was allowed to cool to room temperature. After a small amount of the reaction solution was extracted as a sample, the reaction solution was poured to 18 L of methanol to precipitate the polymer, and the crude product was collected by filtration. The collected crude product was dissolved into 1.4 L of chloroform. The resultant solution was poured to 10 L of methanol for precipitation purification. The precipitate was filtered under reduced pressure, and a modified polyphenylene ether (acylated polyphenylene ether) was collected as a product. The structure of the modified polyphenylene ether was identified by $^1$H-NMR.

$^1$H-NMR (THF-d$_8$) δ 7.84 (s, 2.0H), 7.48 (m, 3.0H), 6.24 (s, 1.0H), 1.86 (m, 6.4H)

No signals of the raw material (2,6-dimethyl-1,4-phenylene ether) were observed. This result indicated formation of a polymer constituted from the constituent represented by the following general formula (19).

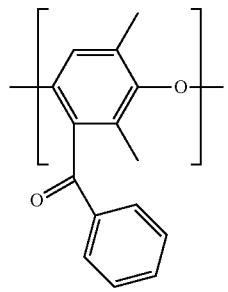

(19)

To a 3-L 4-neck flask flushed with argon gas, 1.3 kg of fuming sulfuric acid was poured and was stirred with a stirring blade of a mechanical stirrer. To the reaction vessel, 130 g of acylated polyphenylene ether prepared as above was added slowly. The reaction liquid was stirred at room temperature for 10 hours, and was then slowly poured into 8 L of iced water to terminate the reaction. The precipitated solid was collected by vacuum filtration, and was washed with 5 L of ion-exchange water. The washing was repeated 9 times in the similar manner until the pH of water used for the washing and separated became 5 or higher. The washed solid was dried under vacuum at 50° C. for 60 hours. The structure of the obtained polymer was identified by $^1$H-NMR.

$^1$H-NMR (THF-d$_8$) δ 8.17-7.45 (m, 3.5H), 6.24 (s, 1.0H), 1.86 (s, 5.7H)

This result confirmed formation of SBzPPE of the general formula (18).

In the result of $^1$H-NMR, the sulfonation ratio (%) was determined as a decline before and after the sulfonation in the area of the signal derived from the aromatic rings of unreacted acylated polyphenylene ether units, with respect to the signal derived from the aromatic rings on the main chain of the acylated polyphenylene ether (δ 6.24 ppm). That is, it was regarded that the decline was attributable to sulfonation of aromatic rings in acylated polyphenylene ether units. The sulfonation ratio of SBzPPE was 31.5%. The EW was 719 g/meq.

Ethanol was add to the SBzPPE to obtain an SBzPPE solution with a composition of SBzPPE/ethanol of 10/90 (% by mass). To this SBzPPE solution, a precursor solution A-1 was blended such that the mass ratio of perfluorosulfonic acid resin and SBzPPE was 50:50 to prepare a precursor solution B-1. Whether the respective peak tops of the scattering diameters of both the SBzPPE solution and the precursor solution A-1 in the dynamic light scattering measurements were within a range of 10 to 200 μm was listed in Table 1.

Then, cerium (IV) oxide as a compatibilizer was dispersed in water to prepare a dispersion of the compatibilizer with a composition of cerium (IV) oxide/water of 0.065/99.935 (% by mass).

The dispersion of the compatibilizer was blended with the precursor solution B-1 such that the concentration of cerium oxide was 0.1% by mass relative to the total amount of solid content, and the blend was stirred with a magnetic stirrer until the blend became uniform to thereby prepare a cast liquid-1 having a solid content concentration of 3% by mass. The transmittance of the cast liquid-1 of UV light at a wavelength of 800 nm in a UV measurement was indicated in Table 1.

(2) Fabrication of Polymer Electrolyte Membrane-1

The resultant cast liquid-1 was applied on a substrate (product name: Kapton 200H, manufactured by DU PONT-TORAY CO., LTD.) using a coater (manufactured by Toyo Seiki Seisaku-Sho, Ltd.) such that the thickness after being dried was 5 μm. The substrate was bonded to a biaxial stretching fine porous membrane (thickness: 5 μm; porosity: 75%) made from a tetrafluoro ethylene-perfluoro alkyl vinyl ether copolymer as disclosed in JP2015-128061A, such that the biaxial stretching fine porous membrane was impregnated with the solid content contained in the cast liquid-1. Thereafter, drying was performed under the condition of 80° C. for 15 minutes. After the drying, the cast liquid-1 was applied on the surface opposite to the substrate such that the thickness of the coating after being dried was 5 μm, and was dried at 80° C. for 30 minutes, followed by drying under a condition of 120° C. for 30 minutes. The resultant membrane was further dried under the condition of 170° C. for 20 minutes to thereby yield a polymer electrolyte membrane-1.

For the resultant polymer electrolyte membrane-1, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Example 2

A autoclave was tightly sealed after being charged with poly [2,2'-(m-phenylene)-5,5'-bibenzimidazole] (manufactured by Sigma-Aldrich Japan, K.K., hereinafter referred to as "PBI") that had a weight average molecular weight of 27,000 and could be compatible, together with dimethylacetamide (DMAC), and was heated to 200° C. and kept for 5 hours. Then, the autoclave was allowed to cool to obtain a PBI solution having a composition of PBI/DMA of 10/90 (% by mass). This PBI solution was dilute with dimethylacetamide to prepare a solution of an additional component (D) with a composition of PBI/DMAC of 0.065/99.935 (% by mass).

A polymer electrolyte membrane-2 was prepared in the manner similar to Example 1, except that a solution of an additional component (D) was blended such that the concentration of PBI became 3% by mass relative to the total amount of solid content at the stage corresponding to the stage for preparing the cast liquid-1 in Example 1.

For the resultant polymer electrolyte membrane-2, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Example 3

A polymer electrolyte membrane-3 was prepared in the manner similar to Example 2, except that the mass ratio of the perfluorosulfonic acid resin to SBzPPE in Example 2 was changed to 80:20. The cast liquid used in this example is referred to as a cast liquid-2.

For the resultant polymer electrolyte membrane-3, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Example 4

A polymer electrolyte membrane-4 was prepared in the manner similar to Example 2, except that the mass ratio of the perfluorosulfonic acid resin to SBzPPE in Example 2 was changed to 90:10.

For the resultant polymer electrolyte membrane-4, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Example 5

A polymer electrolyte membrane-5 was prepared in the manner similar to Example 2, except that cerium (IV) oxide as the compatibilizer was not used, and that SBz-FBzPPE represented by the following general formula (20) was used in place of SBzPPE. In the SBz-FBzPPE, a compatibilization segment of pentafluoro benzoyl group (FBz) was incorporated to a side chain as means of compatibilization.

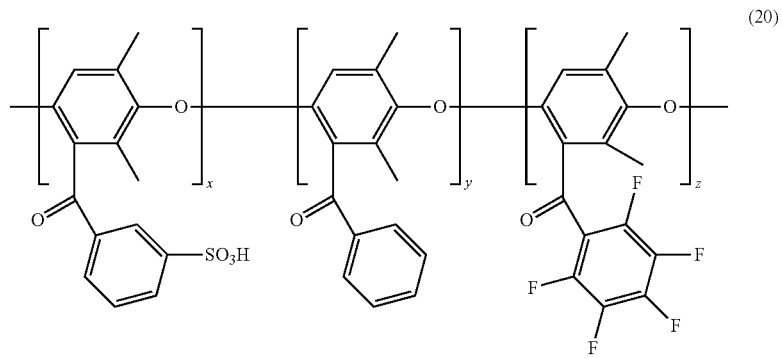

(20)

For the resultant polymer electrolyte membrane-5, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

The SBz-FBzPPE represented by the above general formula (20) was synthesized as follows.

A 200-mL 4-neck flask deaired and flushed with argon gas was charged with 5.0 g of PPE and 80 mL of dichloromethane, and the contents were stirred. In a glove box under an Ar current, 6.1 g of aluminum chloride (anhydrate) that had been grinded in a mortar and weighed, 40 mL of dichloromethane, 2.9 g of benzoyl chloride, and 4.8 g of pentafluorobenzoyl chloride were added and the contents were stirred. The flask was tightly sealed and was taken out of the glove box. The aluminum chloride solution prepared as above was slowly dripped to the PPE solution. The reaction liquid was heated to 40° C. with an aluminum block heater, and refluxed for 12 hours while being heated. The heating was stopped, and the reaction liquid was allowed to cool to room temperature. The reaction liquid was then poured into 900 mL of methanol, and a yellow solid was collected by flirtation. The collected solid was dissolved in 60 mL of chloroform. The resultant solution was poured to 500 mL of methanol for precipitation purification. A white solid was collected by vacuum filtration, and was dried under vacuum at 60° C. for 12 hours to yield 8.4 g of Bz-FBzPPE. The incorporation ratios of Bz groups and FBz groups were calculated to be 56% and 44%, respectively, from the integral values of the respective peaks derived from the Bz and FBz groups in the $^1$H-NMR measurement.

Subsequently, a 100-mL 4-neck flask deaired and flushed with argon gas was charged with 40 g of fuming sulfuric acid, and the content was stirred. To the reaction vessel, 4.0 g of the resultant Bz-FBzPPE was slowly added and was stirred at 60° C. for 1 hour. The reaction liquid was slowly quenched to 120 g of iced water. A precipitated brown solid was collected by vacuum filtration, was poured into ion-exchange water for washing. The solid was washed until the pH of the filtrate became a neutral value, and washing was carried out 9 times in total. The washed solid was dried at 50° C. for 24 hours to yield 2.6 g of SBz-FBzPPE. The sulfonation ratio was determined in the manner similar to Example 1, to be 35%.

Example 6

A polymer electrolyte membrane-6 was prepared in the manner similar to Example 5, except that the mass ratio of a perfluorosulfonic acid resin to SBz-FBzPPE in Example 5 was changed to 80:20.

For the resultant polymer electrolyte membrane-6, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Example 7

A polymer electrolyte membrane-7 was prepared in the manner similar to Example 3, except that sulfonic acid group-containing polybenzimidazole (S-PBI) represented by the following general formula (21) was used as the resin (B).

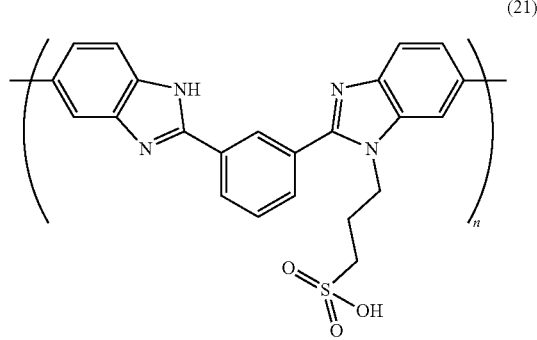

(21)

For the resultant polymer electrolyte membrane-7, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Note that the S-PBI was synthesized in the following procedure.

First, preparations were made in the glove box as follows. A 1-L 4-neck flask was charged with 40 g of PBI and 400 mL of anhydrous dimethylacetamide (DMAc), and the contents were stirred at room temperature for 12 hours to cause PBI to be dissolved. After 17.6 g of hydrogenated sodium was added, the reaction vessel was tightly sealed, taken out of the glove box, and stirred under an Ar current. The reaction vessel was stirred at 35° C. for 16 hours while being heated by an aluminum block heater such that the internal temperature became 35° C. To 100 mL of anhydrous DMAc, 157.6 g of 1,3-propane sultone was dissolved. This solution was slowly dripped to the flask. The reaction liquid was stirred for 24 hours while the internal temperature was maintained to 80° C., and was then allowed to cool to room temperature. To the reaction liquid, 250 g of acetone was added, and the reaction liquid was stirred for a while. Then a solid was collected by vacuum filtration. The resultant fleshed-colored solid was washed with 1 L of acetone 3 times, and was dried under vacuum at 80° C. for 12 hours to yield 150.5 g of S-PBI.

Example 8

The cast liquid-2 used in Example 3 was applied on a substrate (product name: Kapton 200H, manufactured by DU PONT-TORAY CO., LTD.) using a coater (manufactured by Toyo Seiki Seisaku-Sho, Ltd.) such that the thickness after being dried was 3 μm. Thereafter, drying was performed under the condition of 80° C. for 15 minutes. After the drying, the precursor solution A-1 of Example 1 was applied on the surface of the layer (A) opposite to the substrate surface such that the thickness of the coating after being dried was 7 μm, and was dried at 80° C. for 30 minutes, followed by drying under a condition of 120° C. for 30 minutes. Thus, a layer (B) was laminated. The resultant membrane was further dried under the condition of 170° C. for 20 minutes to thereby yield a polymer electrolyte membrane-8.

The resultant polymer electrolyte membrane-8 was dissected with the ultramicrotome (product name: EM UC7 manufactured by Leica Microsystems) to obtain a slice sample, and the cross-section was analyzed using an infrared spectrometer (product name: IRT-5200 manufactured by JASCO Corporation). A peak derived from C—F bonds appeared near 1000 to 1200 $cm^{-1}$ was observed in the entire cross-section. Furthermore, the peaks derived from C—H bonds in the aromatic rings appeared near 1400 to 1600 $cm^{-1}$ and 2900 to 3100 $cm^{-1}$ were observed in the layer (A) containing the resin (A) and the resin (B), but was not observed in the layer (B) containing the resin (A).

For the resultant polymer electrolyte membrane-8, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Example 9

A polymer electrolyte membrane-9 was prepared in the manner similar to Example 1, except that graphene oxide was used in place of SBzPPE in Example 1, and that no compatibilizer was used. Graphene oxide was blended with a perfluorosulfonic acid resin with a mass ratio of perfluorosulfonic acid resin:graphene oxide of 97:3.

For the resultant polymer electrolyte membrane-9, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Comparative Example 1

A polymer electrolyte membrane-10 was prepared in the manner similar to Example 1, except that cerium (IV) oxide used as a compatibilizer in Example 1 was not used.

For the resultant polymer electrolyte membrane-10, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1. Although a sea-island phase-separation structure constituted from islands of carbon and sea of fluorine was observed, the size of the islands was widely varied from coarse to minute ones and the numerous islands with irregular shapes such as meandering and elongated shapes were observed.

Comparative Example 2

A polymer electrolyte membrane-11 was prepared in the manner similar to Comparative Example 1, except that the weight ratio of the perfluorosulfonic acid resin to SBzPPE in Comparative Example 1 was changed to 80:20 and that SBzPPE was blended using the method of blending SPPE in Example 5 in JP2014-232663A.

For the resultant polymer electrolyte membrane-11, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

Comparative Example 3

A polymer electrolyte membrane-12 was prepared in the manner similar to Comparative Example 1, except that the weight ratio of the perfluorosulfonic acid resin to SBzPPE in Comparative Example 1 was changed to 95:5.

For the resultant polymer electrolyte membrane-12, whether a sea-island phase-separation structure was formed, the average aspect ratio (long axis/short axis), the proportion of the relative standard deviations (×1,500/×150), the average carbon-fluorine peak intensity ratio, the hydrogen permeability coefficient, the elongation at break, the chemical durability, and the physical durability were determined. The results are listed in Table 1.

TABLE 1

| | | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|
| Layer containing resin (A) and resin (B) | Types of resin (A) | PFSA(n0) | PFSA(n0) | PFSA(n0) | PFSA(n0) | PFSA(n0) | PFSA(n0) | PFSA(n0) | PFSA(n0) | PFSA(n0) + GO* | PFSA(n0) | PFSA(n0) | PFSA(n0) |
| | Types of resin (B) | SBzPPE | SBzPPE | SBzPPE | SBzPPE | SBz-FBzPPE | SBz-FBzPPE | S-PBI | SBzPPE | — | SBzPPE | SBzPPE | SBzPPE |
| | Mass ratio of resin (A) and resin (B) (mass of resin (A)/mass of resin (B)) | 50/50 | 50/50 | 80/20 | 90/10 | 50/50 | 80/20 | 80/20 | 80/20 | — | 50/50 | 80/20 | 95/5 |
| | Use of compatibilizer (C) | YES | YES | YES | YES | NO | NO | YES | YES | NO | NO | NO | NO |
| | Types of compatibilizer (C) | Cerium (IV) oxide | Cerium (IV) oxide | Cerium (IV) oxide | Cerium (IV) oxide | — | — | Cerium (IV) oxide | Cerium (IV) oxide | — | — | — | — |
| Layer containing resin (A) | Types of resin (A) | — | — | — | — | — | — | — | PFSA(n0) | — | — | — | — |
| Evaluations | (1-1) Formation of phase-separation structure | YES | YES | YES | YES | YES | YES | YES | YES | YES | YES | YES | YES |
| | (1-2) Average carbon-fluorine peak intensity ratio | 8.5 | 7.9 | 2.4 | 1.6 | 10.8 | 4.8 | 1.1 | 2.3 | 20 | 0.91 | 0.47 | 0.14 |
| | (1-3) Proportion of relative standard deviation | 2.0 | 1.3 | 1.0 | 1.0 | 0.82 | 1.2 | 0.55 | 1.0 | 5.0 | 5.9 | 0.16 | 0.12 |
| | (2) Average aspect ratio | 9.5 | 3.5 | 2.5 | 1.5 | 6.0 | 7.7 | 2.1 | 2.5 | 1.5 | 10.3 | 1.3 | 1.1 |
| | (3) Hydrogen permeability coefficient (cc·cm/cm²·s·cmHg) | 2.3 | 2.0 | 0.84 | 1.4 | 3.2 | 0.90 | 1.2 | 1.1 | 2.8 | 20 | 5.3 | 15.0 |
| | (4) Peak top of scattering diameter in dynamic light scattering | G | G | G | G | G | G | G | G | B | B | B | B |
| | (5) Transmittance in UV measurement (% T) | 95.5 | 94.2 | 99.8 | 95.5 | 90.0 | 98.3 | 97.6 | 99.7 | 38.0 | 74.6 | 89.0 | 89.5 |
| | (6) Elongation at break (%) | 150 | 189 | 198 | 210 | 166 | 173 | 202 | 170 | 130 | 50 | 60 | 155 |
| | (7) Chemical durability (hours) | 420 | 670 | 980 | 895 | 478 | 940 | 705 | 610 | 350 | 30 | 110 | 175 |
| | (8) Physical durability (cycle) | 48050 | 55210 | 64500 | 70300 | 40550 | 60370 | 59210 | 42100 | 10200 | 340 | 1030 | 1530 |

GO* = graphene oxide

INDUSTRIAL APPLICABILITY

The polymer electrolyte membrane of the present embodiment is industrially applicable to a proton exchange membrane for a solid polymer electrolyte fuel cell, a membrane electrode assembly, and a fuel cell. It can also be applied and thus is industrially applicable to a separation membrane for water electrolysis and a separation membrane for a redox flow secondary battery.

The invention claimed is:

1. A polymer electrolyte membrane comprising:
a perfluorosulfonic acid resin (A),
wherein the polymer electrolyte membrane has a phase-separation structure having a phase where fluorine atoms are detected in majority and a phase where carbon atoms are detected in majority, in an image of a membrane surface observed under an SEM-EDX, and
the polymer electrolyte membrane has a phase having an average aspect ratio of 1.5 or more and 10 or less in an image of a membrane cross-section observed under an SEM.

2. The polymer electrolyte membrane of claim 1, wherein a proportion of a relative standard deviation of a carbon-fluorine peak intensity ratio at a magnification of ×1,500 and a relative standard deviation of a carbon-fluorine peak intensity ratio at a magnification of ×150 (the relative standard deviation at ×1,500/the relative standard deviation at ×150) in the image of the membrane surface observed under the SEM-EDX is 0.20 or more and 5.0 or less.

3. The polymer electrolyte membrane of claim 2, wherein an average carbon-fluorine peak intensity ratio at a magnification of ×1,500 in the image of the membrane surface observed under the SEM-EDX is 0.50 or more and 20 or less, and
a hydrogen permeability coefficient at 80° C. and in a relative humidity (RH) of 30% is $5.0 \times 10^{-9}$ cc·cm/cm$^2$·s·cmHg or less.

4. The polymer electrolyte membrane of claim 1, wherein the phase-separation structure is a sea-island structure.

5. The polymer electrolyte membrane of claim 1, further comprising an acidic group-containing aromatic hydrocarbon resin (B).

6. The polymer electrolyte membrane of claim 5, wherein a mass ratio of the perfluorosulfonic acid resin (A) and the acidic group-containing aromatic hydrocarbon resin (B) (a mass of the resin (A)/a mass of the resin (B)) is 90/10 to 50/50.

7. The polymer electrolyte membrane of claim 5, further comprising a compatibilizer (C) for the perfluorosulfonic acid resin (A) and the acidic group-containing aromatic hydrocarbon resin (B).

8. The polymer electrolyte membrane of claim 5, wherein the polymer electrolyte membrane is produced through a step of mixing a solution containing the perfluorosulfonic acid resin (A) and a solution containing the acidic group-containing aromatic hydrocarbon resin (B).

9. The polymer electrolyte membrane of claim 8, wherein peak tops of scattering diameters of the solution containing the perfluorosulfonic acid resin (A) and the solution containing the acidic group-containing aromatic hydrocarbon resin (B) in a dynamic light scattering measurement are within a range of 10 μm or more and 200 μm or less.

10. The polymer electrolyte membrane of claim 7, wherein the polymer electrolyte membrane is produced through a step of mixing the solution containing the perfluorosulfonic acid resin (A), the solution containing the acidic group-containing aromatic hydrocarbon resin (B), and a solution containing the compatibilizer (C).

11. The polymer electrolyte membrane of claim 10, wherein a mixed solution of the solution containing the perfluorosulfonic acid resin (A), the solution containing the acidic group-containing aromatic hydrocarbon resin (B), and the solution containing the compatibilizer (C) has a transmittance of 90% T or more at a wavelength of 800 nm in an UV measurement.

12. The polymer electrolyte membrane of claim 10, wherein a solid content concentration of the compatibilizer (C) in the mixed solution of the solution containing the perfluorosulfonic acid resin (A), the solution containing the acidic group-containing aromatic hydrocarbon resin (B), and the solution containing the compatibilizer (C) is 0.001% by mass or more and less than 1% by mass.

13. The polymer electrolyte membrane of claim 1, comprising:
a layer containing the perfluorosulfonic acid resin (A) and the acidic group-containing aromatic hydrocarbon resin (B); and
a layer containing the perfluorosulfonic acid resin (A).

14. A membrane electrode assembly comprising the polymer electrolyte membrane of claim 1 and an electrode catalyst layer.

15. A solid polymer electrolyte fuel cell comprising the membrane electrode assembly of claim 14.

16. The polymer electrolyte membrane of claim 2, wherein the phase-separation structure is a sea-island structure.

17. The polymer electrolyte membrane of claim 2, further comprising an acidic group-containing aromatic hydrocarbon resin (B).

18. The polymer electrolyte membrane of claim 2, comprising:
a layer containing the perfluorosulfonic acid resin (A) and the acidic group-containing aromatic hydrocarbon resin (B); and
a layer containing the perfluorosulfonic acid resin (A).

19. A membrane electrode assembly comprising the polymer electrolyte membrane of claim 2 and an electrode catalyst layer.

* * * * *